(12) United States Patent
Bianchi

(10) Patent No.: US 12,369,739 B2
(45) Date of Patent: *Jul. 29, 2025

(54) DOUBLE-HINGED FOOD PRESS DEVICE, SYSTEM AND METHOD

(71) Applicant: Revise Products LLC, Santa Cruz, CA (US)

(72) Inventor: Stephan Bianchi, Santa Cruz, CA (US)

(73) Assignee: Revise Products LLC, Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,301

(22) Filed: Aug. 8, 2023

(65) Prior Publication Data

US 2023/0380620 A1 Nov. 30, 2023

Related U.S. Application Data

(62) Division of application No. 17/206,264, filed on Mar. 19, 2021, now Pat. No. 11,744,395.

(51) Int. Cl.
*B30B 9/06* (2006.01)
*A47J 19/00* (2006.01)
*A47J 19/06* (2006.01)

(52) U.S. Cl.
CPC ............ *A47J 19/06* (2013.01); *A47J 19/005* (2013.01); *B30B 9/06* (2013.01)

(58) Field of Classification Search
CPC .... B30B 9/02; B30B 9/04; B30B 9/06; B30B 15/08; A47J 19/02; A47J 19/04;

(Continued)

(56) References Cited

U.S. PATENT DOCUMENTS

| 216,699 | A | 6/1879 | Eeynolds |
| 240,858 | A | 5/1881 | Stbbee |

(Continued)

FOREIGN PATENT DOCUMENTS

| CH | 313348 A | 4/1956 |
| DE | 919968 C | 11/1954 |

(Continued)

OTHER PUBLICATIONS

ISA/US, Written Opinion of the International Search Authority, PCT/US17/27821 (WO2017181155), Nov. 28, 2017.

(Continued)

*Primary Examiner* — Jimmy T Nguyen
(74) *Attorney, Agent, or Firm* — The Law Office of Patrick F. O'Reilly III, LLC

(57) ABSTRACT

A double-hinged food press for extruding foodstuff through a grate and operational by hand while held aloft or placed on a work surface. An upward-curved plunger handle, combined with a receiver handle designed to rest on the surface, positions the press for the operation. Rollers enable the grate to be snapped smoothly over risers into and out of recesses in the receiver without undue wear and resulting loss of integrity. A raised lip of resilient material surrounding a plunger face further ensures a tight fit between the plunger and receiver cup. Resilient material between the plunger face and the hinge barrel of the grate ensures a tight fit between the two. Hinge pins may be removed by the user for replacement of the grate. Bosses can extend from the receiver unit for support on the surface to assist in operation of the press. An attachable paddle can be used to collect extruded material and to scrape it from the grate.

5 Claims, 28 Drawing Sheets

(58) Field of Classification Search
CPC ........ A47J 19/022; A47J 19/023; A47J 19/06;
A47J 19/005; A47J 43/04; A47J 43/286;
A47J 44/00; A47J 2043/04481; A47J
2043/0449; A23N 1/00; A23N 1/02;
A23L 2/04
See application file for complete search history.

(56) References Cited

U.S. PATENT DOCUMENTS

| | | | |
|---|---|---|---|
| 280,257 A | 6/1883 | Stein | |
| 386,694 A | 7/1888 | Edie | |
| 441,419 A | 11/1890 | Jones | |
| 581,526 A | 4/1897 | Straube | |
| 620,047 A | 2/1899 | Neal | |
| 628,470 A | 7/1899 | Henry | |
| 694,617 A | 3/1902 | Coomber | |
| 726,075 A | 4/1903 | Kress | |
| 782,406 A | 2/1905 | Mayhew et al. | |
| 980,466 A | 1/1911 | Williams | |
| 1,399,708 A | 12/1921 | Ferdon | |
| 1,457,478 A | 6/1923 | Williams et al. | |
| 1,938,463 A | 12/1933 | Roberts | |
| 1,939,307 A | 12/1933 | Majewski, Jr. | |
| 2,111,997 A | 3/1938 | Stephens | |
| 2,220,458 A | 11/1940 | Osterman | |
| 2,776,616 A | 1/1957 | Sarossy | |
| 3,327,621 A | 6/1967 | Zysset | |
| 4,023,875 A * | 5/1977 | Difley | B30B 9/3003 |
| | | | 312/319.1 |
| 4,069,752 A | 1/1978 | Ahner | |
| 4,183,295 A * | 1/1980 | Peterson | B30B 9/3032 |
| | | | 292/120 |
| D265,506 S | 7/1982 | Finamore | |
| 4,389,315 A | 6/1983 | Crocket | |
| 4,466,346 A | 8/1984 | Gemelli | |
| 4,531,457 A | 7/1985 | Sivaslian | |
| 4,545,299 A | 10/1985 | Ahner | |
| D293,757 S | 1/1988 | Pedrini | |
| 5,097,597 A | 3/1992 | Bianchi | |
| 5,101,720 A | 4/1992 | Bianchi | |
| 5,165,335 A | 11/1992 | Bianchi | |
| 5,329,846 A | 7/1994 | Bonutti | |
| 5,370,044 A | 12/1994 | Lackie | |
| 5,396,836 A | 3/1995 | Kim | |
| 5,463,941 A | 11/1995 | Gibson | |
| 5,467,699 A | 11/1995 | Laib | |
| 5,490,454 A | 2/1996 | Ancona et al. | |
| 5,513,562 A | 5/1996 | Moor | |
| 5,520,104 A | 5/1996 | Ancona et al. | |
| 5,529,252 A | 6/1996 | Baines | |
| 5,662,710 A | 9/1997 | Bonutti | |
| 5,791,237 A | 8/1998 | Gibson | |
| D417,824 S | 12/1999 | Joergensen | |
| 6,109,170 A | 8/2000 | Short et al. | |
| 6,131,508 A | 10/2000 | Tsai | |
| 6,196,122 B1 | 3/2001 | Lai | |
| 6,382,090 B1 | 5/2002 | Kokkinos et al. | |
| 6,409,107 B1 | 6/2002 | Romano | |
| 6,543,344 B1 | 4/2003 | Settele | |
| D499,941 S | 12/2004 | Levien | |
| 6,974,098 B2 | 12/2005 | Keller | |
| 7,000,535 B2 | 2/2006 | Harrison-Griffin et al. | |
| 7,117,785 B2 | 10/2006 | Walker, III | |
| 7,389,892 B2 | 6/2008 | Park | |
| 7,703,176 B2 | 4/2010 | Webb et al. | |
| D614,923 S | 5/2010 | Ericsson et al. | |
| 7,946,222 B2 | 5/2011 | Webb | |
| D670,544 S | 11/2012 | Junker | |
| 8,322,277 B2 | 12/2012 | Griffith | |
| 8,534,190 B2 | 9/2013 | Ericsson et al. | |
| D711,199 S | 8/2014 | Regadanz | |
| D723,343 S | 3/2015 | Anzalone | |
| 9,237,822 B2 | 1/2016 | Peronti et al. | |
| 9,706,869 B2 | 7/2017 | Peronti et al. | |
| 9,980,594 B2 * | 5/2018 | Wong | B30B 9/06 |
| 10,194,765 B2 | 2/2019 | Peronti et al. | |
| D844,391 S | 4/2019 | Cabrita | |
| 10,258,198 B2 | 4/2019 | Ebrahim et al. | |
| D849,488 S | 5/2019 | Holding et al. | |
| D866,273 S | 11/2019 | Pawluskiewicz et al. | |
| 10,508,667 B2 | 12/2019 | Bianchi | |
| D878,170 S | 3/2020 | Hua | |
| D915,838 S | 4/2021 | Wu | |
| D959,933 S | 8/2022 | Tehrani | |
| 11,744,395 B2 * | 9/2023 | Bianchi | A47J 19/06 |
| | | | 100/110 |
| 2007/0190214 A1 | 8/2007 | Willcocks et al. | |
| 2013/0186289 A1 | 7/2013 | Garcia | |
| 2016/0128377 A1 * | 5/2016 | Lee | A47J 19/005 |
| | | | 100/213 |
| 2017/0150849 A1 | 6/2017 | Simard | |
| 2017/0181580 A1 | 6/2017 | Wong | |
| 2018/0213961 A1 * | 8/2018 | Dumler | A47J 19/005 |

FOREIGN PATENT DOCUMENTS

| | | | |
|---|---|---|---|
| DE | 202013102773 U1 | 7/2013 | |
| EP | 2233050 A2 | 9/2010 | |
| EP | 3202689 A1 * | 8/2017 | ............... B61B 3/00 |
| FR | 831225 A | 8/1938 | |
| FR | 1093394 A | 5/1955 | |
| FR | 1200644 A | 12/1959 | |
| GB | 2355921 A | 5/2001 | |
| GB | 2512870 A | 10/2014 | |
| WO | 2011151673 A1 | 12/2011 | |
| WO | 2017181155 A2 | 10/2017 | |
| WO | 2017181155 A3 | 10/2017 | |

OTHER PUBLICATIONS

"Savora Garlic Press", Web page <http://www.amazon.com/Savora5099569GarlicPressCrimson/dp/B00AV9GTFA>, Sep. 24, 2020.
"Art and Cook Garlic Press Chrome Dreams Collection", Web page <https://www.amazon.com/Art-Cook-Garlic-Chrome-Collection/dp/B002P3K7G2>, Sep. 24, 2020.
"Garlic press Easy Clean, Plastic black", Web page <https://www.smartasaker.se/sv/artiklar/vitlokspress-easy-clean.html>, Sep. 24, 2020.
"Dreamfarm Garject Lite 2-In-1 Garlic Peeler, Garlic Press & Mincer with Garlic Peel Ejector", Amazon Website, Web page <https://www.amazon.com/Dreamfarm-Garject-Lite-Self-Cleaning-Garlic/dp/B00GM3IKR4?th=1>, 13 pages, dated Nov. 11, 2013, retrieved from www.amazon.com website on Jan. 31, 2025.
"Vacu Vin Garlic Press", Amazon Website, Web page <https://www.amazon.in/Vacu-Vin-6883350-Garlic-Press/dp/B002Q4TV1M>, 3 pages, dated Nov. 9, 2012, retrieved from www.amazon.com website on Jan. 31, 2025.
"Clean-Press Green Garlic Crusher", Joseph Joseph Website, Web page <https://eu.josephjoseph.com/products/clean-press-garlic-crusher-green>, 3 pages, dated at least as early as Jan. 4, 2018, retrieved from wwweu.josephjoseph.com website on Jan. 31, 2025.
"Urban Trend Forza Garlic Press", Amazon Website, Web page <https://www.amazon.in/Urban-Trend-Forza-Garlic-Press/dp/B00ISQTYZM>, 4 pages, dated Jan. 14, 2015, retrieved from www.amazon.in website on Jan. 31, 2025.
"Cuisipro Countertop Garlic Press", Amazon Website, Web page <https://www.amazon.com.au/Cuisipro-747111-Countertop-Garlic-Press/dp/B0014ZUFGO>, 4 pages, dated Aug. 19, 2012, retrieved from www.amazon.com.au website on Jan. 31, 2025.
"Trudeau Stress Less Garlic Press", YouTube Website, Web page <https://www.youtube.com/watch?v=kpFHZecErNM>, 3 pages, dated Sep. 12, 2012, retrieved from www.youtube.com website on Jan. 31, 2025.
"Zyliss Susi 3 Garlic Press", Amazon Website, Web page <https://www.amazon.com/Zyliss-Susi-Garlic-Press-Need/dp/B007D3V00Q/>, 11 pages, dated Feb. 24, 2012, retrieved from www.amazon.com website on Feb. 1, 2025.
"Kuhn Rikon Black Easy Squeeze Garlic Press", Trouva Website, Web page <https://www.trouva.com/en-us/product/kuhn-rikon-black-easy-squeeze-garlic-press?srsltid=AfmBOooo9-8llii2nwNHtppm-_

(56) References Cited

OTHER PUBLICATIONS

T0A1gZB6KjPljmeTuVs0Jldxfd7HN>, 8 pages, dated at least as early as Jul. 2015, retrieved from www.trouva.com website on Feb. 1, 2025.
"Zwilling Pro Garlic Press", Amazon Website, Web page <https://www.amazon.com/ZWILLING-J-A-Henckels-Garlic-Press/dp/B07N1VM76V>, 6 pages, dated Jan. 23, 2019, retrieved from www.amazon.com website on Feb. 1, 2025.

* cited by examiner

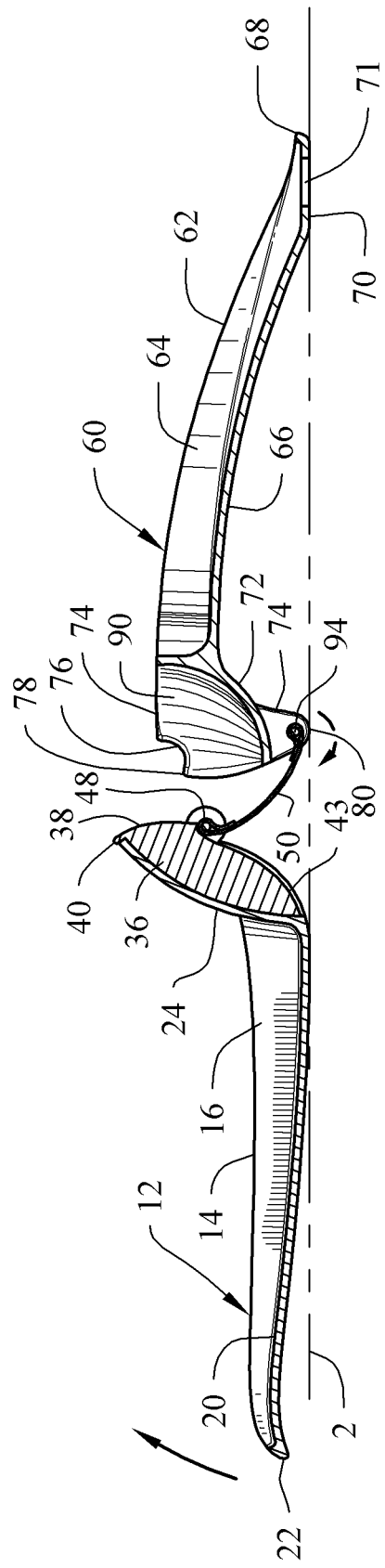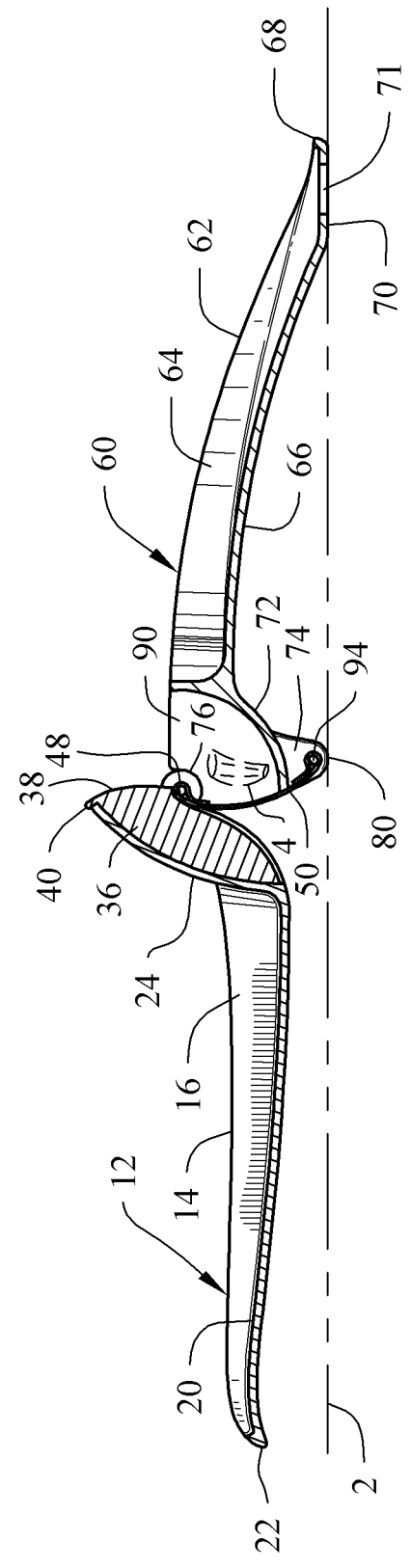

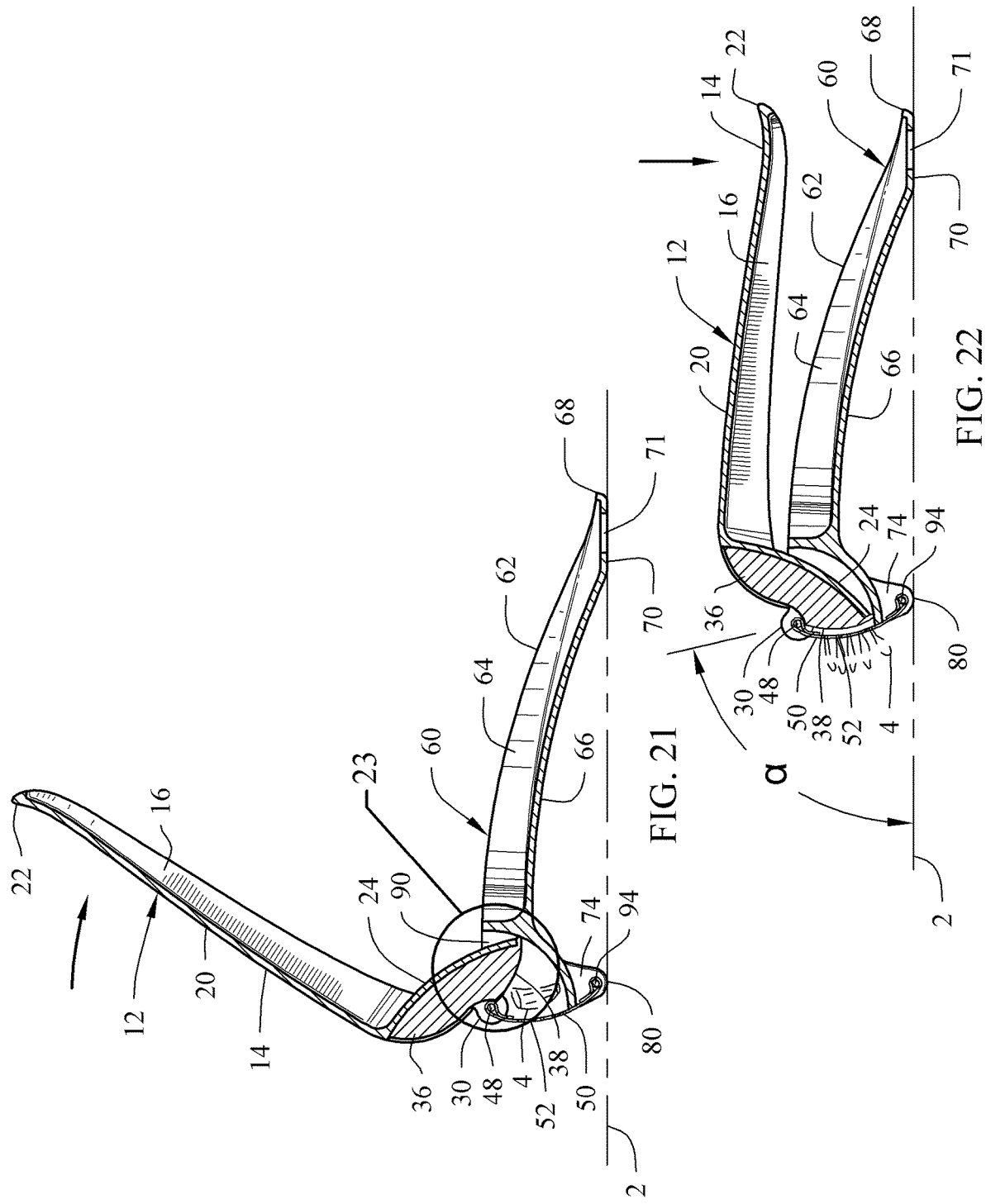

DOUBLE-HINGED FOOD PRESS DEVICE, SYSTEM AND METHOD

CROSS-REFERENCE TO RELATED APPLICATIONS

The present application is a divisional of U.S. Nonprovisional patent application Ser. No. 17/206,264, entitled "Double-Hinged Food Press Device, System And Method", filed on Mar. 19, 2021, the disclosure of which is herein expressly incorporated by reference in its entirety.

BACKGROUND

Technical Field

The present technology relates to a double-hinged food press device, system and/or method for use in connection with compressing foodstuff and extruding or extracting material therefrom. Some aspects of the present technology are a hand-operated double-hinged food press device, system and/or method specifically intended for pressing foodstuff by hand such as, but not limited to, garlic, ginger, citrus or inedible materials as well. In other aspects of the present technology, the press is enlarged or adapted to machine processing.

Background Description

Many variations of types of hand-operated presses are known, with some presses utilizing manual hand power, screw presses or motorized assemblies.

A need exists for a new double-hinged food press device, system and/or method that is capable of operating in an improved manner in view of known food press devices. In this regard, the present technology substantially fulfills this need.

SUMMARY

In view of the foregoing disadvantages inherent in the known types of food presses, the present technology provides a novel double-hinged food press device, system and method, and overcomes one or more of the mentioned disadvantages and drawbacks of the prior art. As such, the general purpose of the present technology, which will be described subsequently in greater detail, is to provide a new and novel double-hinged food press device, system and method which has all the advantages of the prior art mentioned heretofore and many novel features that result in a double-hinged food press device, system and method which is not anticipated, rendered obvious, suggested, or even implied by the prior art, either alone or in any combination thereof.

According to one aspect, the present technology can include a press system including a plunger unit, a receiver unit and a grate. The plunger unit can include a plunger and one or more rollers. The receiver unit can include a receiver cup, and one or more recesses. The receiver cup can define a cavity configured to receive at least a portion of the plunger. The grate can include perforations, a first end section rotatably fittable with the plunger unit, and a second end section rotatably fittable with the receiver unit. The plunger unit and the receiver unit can be rotatable with each other to orient the press system between a mated position and an unmated position. In the mated position, at least a portion of the rollers can be received in the recesses, respectively, and the plunger can be capable of sweeping the cavity and pressing an object against the grate. In the unmated position, the rollers are not received in the recesses, respectively.

According to another aspect, the present technology can include a press system including a plunger unit, a receiver unit and a grate including perforations. The grate can include perforations, a first end section rotatably fittable with the plunger unit, and a second end section rotatably fittable with the receiver unit. The plunger unit can include a plunger with a lip extending from at least a portion of a perimeter of a front side of the plunger. The receiver unit can include a receiver cup. The receiver cup can define a cavity configured to receive at least the front side of the plunger. The plunger unit and the receiver unit can be rotatable in relation with each other upon two separate axes so that the lip contacts and sweeps a surface of the receiver cup that defines the cavity.

According to one aspect, the present technology can include a press system including a plunger unit, a receiver unit and a grate. The plunger unit can include a plunger and one or more rollers. The receiver unit can include a receiver cup, and one or more recesses. The receiver cup can define a cavity configured to receive at least a portion of the plunger. The grate can include perforations, a first end section rotatably fittable with the plunger unit, and a second end section rotatably fittable with the receiver unit. The plunger unit can be rotatable about any one of the first end section and the second end section of the grate to orient the plunger into a mated position within the cavity such that that plunger sweeps the cavity and presses an object against the grate, or away to an unmated position such that the plunger is outside of the cavity. The one or more recesses can each be configured to receive a portion of at least one of the rollers, respectively, when in the mated position.

According to another aspect, the present technology can include a press system for extruding foodstuff including a plunger unit, a receiver unit and a grate. The plunger unit can include a plunger featuring a front side, a plunger seal lip associated with at least a perimeter of the front side, a plunger handle extending from the plunger and a roller rotatably associated on either side of the plunger. The receiver unit can include a receiver cup including a pair of receiver guides each defining a recess, and a receiver handle extending from the receiver cup. The receiver cup and the receiver guides can define a cavity configured to receive at least the plunger seal lip and the front side of the plunger. The recesses can each be configured to receive a portion of at least one of the rollers, respectively. The grate can include perforations, a first end section rotatably fittable with the plunger unit, and a second end section rotatably fittable with the receiver unit. The plunger unit can be rotatable about any one of the first end section and the second end section of the grate to orient the first side of the plunger into a mated position within the cavity such that the plunger seal lip sweeps the cavity and the front side of the plunger presses an object against the grate, or away to an unmated position such that the front side of the plunger is outside of the cavity.

According to yet another aspect, the present technology can include a press system for extruding foodstuff including a plunger unit, a receiver unit and a grate. The plunger unit can include a plunger, a plunger seal insert attachable to the plunger, a plunger handle extending from the plunger, a pair of hinge guides extending from the plunger and a roller rotatably associated with each of the hinge guides. The plunger seal insert can include a front side, and a plunger seal lip associated with at least a perimeter of the front side.

The receiver unit can include a receiver cup including a pair of receiver guides each defining a recess, a receiver handle extending from the receiver cup, and a pair of bosses extending from the receiver cup. The receiver cup and the receiver guides can define a cavity configured to receive at least the plunger seal lip and the front side of the plunger seal insert. The recesses can each be configured to receive a portion of at least one of the rollers, respectively. The grate can include perforations, a first end section rotatably fittable with the plunger unit, and a second end section rotatably fittable with the receiver unit. The plunger unit can be rotatable about any one of the first end section and the second end section of the grate to orient the first side of the plunger into a mated position within the cavity such that that the plunger seal lip sweeps the cavity and the grate, and the front side of the plunger seal insert presses an object against the grate, or away to an unmated position such that the front side of the plunger is outside of the cavity. The bosses can each include a free end and the receiver handle can include a planar portion, with the free ends of the bosses and the planar portion being configured to support the receiver unit on a support surface so that the foodstuff can be extruded through the perforations of the grate above and at an angle in relation to the support surface.

According to still yet another aspect, the present technology can include a method of using a press system for extruding foodstuff. The method can include the steps of rotating a plunger unit about any one of a first end section of a grate that is rotatably fittable to the plunger unit and a second end section of the grate that is rotatably fittable to the receiver unit, so that rollers of the plunger are received in recesses defined in the receiver cup and the grate is adjacent an exit opening of a receiver cup of the receiver unit. Continuing rotating the plunger unit until a plunger of the plunger unit sweeps the cavity and presses foodstuff located in the cavity against the grate. Continuing rotating the plunger unit until the foodstuff is extruded through perforations defined through the grate.

According to even yet another aspect, the present technology can include a kit including the following parts: being a plunger unit, one or more plunger pins, two or more rollers, grates each having perforations, a receiver unit and one or more receiver pins. The perforations of each grate being different in any one of size and shape from each other. The kit can include instructions manual such that functional and assembled relationships are detailed in relation to the parts. A packaging configured to contain the plunger unit, the plunger pins, the two or more rollers, the grates, the receiver unit, the receiver pins and the instructions manual.

According to still another aspect, the present technology can include a double-hinged food press in which a face of a plunger is surrounded by a lip protruding laterally from a body of the plunger to create a tight seal against a food-receiving cup.

According to another aspect, the present technology can include a double-hinged food press in which farthermost downward protuberances of a receiver unit and a receiver handle describe an area of a plane having a width greater than two-thirds the distance between axes of grate hinges.

According to yet another aspect, the present technology can include a double-hinged food press in which one or more of farthermost downward protuberances of a receiver unit and a receiver handle comprise a plane rather than a curved surface tangent to a plane.

According to still another aspect, the present technology can include a double-hinged food press in which the farthermost downward protuberances of a receiver unit and a receiver handle describe a plane, and a plunger handle is upswept to constrain a hand of an operator as the plunger handle is pressed towards the plane.

According to another aspect, the present technology can include a double-hinged food press in which a plunger is supplied with rollers free to rotate independently of both the plunger and a grate.

Some or all embodiments of the present technology can include a plunger seal associated with the plunger, wherein a portion of the plunger seal can be configured to contact a surface of the receiver cup that at least partially defines the cavity.

In some or all embodiments, the recesses can each include a riser configured so the rollers surmount the riser prior to being received in the recesses, respectively.

In some or all embodiments, the risers can be configured to retain the rollers in the recesses, respectively.

In some or all embodiments, the plunger can include a lip configured to contact a surface of the receiver cup that at least partially defines the cavity.

Some or all embodiments of the present technology can include a plunger seal insert attachable to the plunger. The plunger seal insert can include a plunger seal lip configured to contact a surface of the receiver cup that at least partially defines the cavity.

In some or all embodiments, the plunger seal insert can include a plunger front side and a central channel. The plunger front side can be configured to contact and press the object against the grate and including the plunger seal lip. The central channel can be configured to rotatably receive the first end section of the grate.

In some or all embodiments, a portion of the plunger seal insert can be configured to be received in a plunger cavity defined in the plunger. Any one of or any combination of the plunger cavity and the plunger seal insert can include one or more ribs configured to support the plunger seal insert when assembled with the plunger.

In some or all embodiments, the plunger unit can include two or more hinge guides extending thereout. The hinge guides can be in a spaced apart relationship and configured to receive the first end section of the grate therebetween.

In some or all embodiments, the rollers are adjacent with a side of the hinge guides opposite the first end section of the grate, respectively.

In some or all embodiments, a portion of the rollers can extend outward of the recesses of the receiver cup when the rollers are received in the recesses, respectively, and can be configured to support the receiver cup against lateral deformation.

In some or all embodiments, the receiver unit can include two or more bosses extending from the receiver cup. The bosses can be in a spaced-apart relationship configured to rotatably receive the second end section of the grate therebetween.

Some or all embodiments of the present technology can include one or more plunger pins and one or more receiver pins. The plunger pins can be receivable through the hinge guides with each free end of the plunger pins being associated with at least one of the rollers. The first end section of the grate can be associated with the plunger pins. The receiver pins can be receivable through the bosses. The second end section of the grate can be associated with the receiver pins.

In some or all embodiments, the plunger pin and/or the receiver pin can be a hollow tube including flared ends.

In some or all embodiments, the plunger unit can include a plunger handle, and the receiver unit can include a receiver handle.

In some or all embodiments, the receiver handle can include a planar portion, where a free end of the bosses and the planar portion can be configured to support the receiver unit on a support surface while positioning the receiver cup spaced apart with the support surface.

In some or all embodiments, the receiver handle can include outermost protrusion or protrusions that, along with a free end of the bosses, can be configured to support the receiver unit on a support surface, the interface having a width greater than a percent of the distance between an axis of the plunger and receiver pins while positioning the receiver cup spaced apart with the support surface supporting the receiver unit.

In some or all embodiments, the percent of the width is between 60-70% or two thirds.

In some or all embodiments, the receiver unit can include a flat base.

In some or all embodiments, the receiver handle can include a profile configured to provide an open space between a receiver handle wall and the support surface when the receiver unit is placed on the support surface.

In some or all embodiments, the plunger handle can include a plunger handle free end section that curves outwardly from the plunger handle in a direction away from the plunger.

In some or all embodiments, the recesses can have a longitudinal axis that is orthogonal to a longitudinal axis of the receiver handle.

In some or all embodiments, the receiver cup can include at least two receiver guides that further define the cavity. The receiver guides can each include a thickened section extending out therefrom in opposite directions. The thickened section can have a thickness greater than a thickness of the receiver guides, respectively, and at least one of the recesses can be defined in the thickened section of each of the receiver guides.

In some or all embodiments, at least a portion of the first end section of the grate can have a width that is greater than a width of the second end section or at least a portion of the second end section of the grate can have a width greater than a width of the first end section.

Some or all embodiments of the present technology can include a paddle attachable to the receiver unit. The paddle can include a troughed section positionable adjacent the grate when the paddle is attached to the receiver unit. The trough section is configured to receive material extruded through the grate.

In some or all embodiments, the trough section can include a lateral edge that contacts the grate when the paddle is attached with the receiver unit.

In some or all embodiments, the paddle can include a tongue that projects upwardly and away from an end of the trough section and toward the lateral edge to define an opened area between the tongue and the trough section.

In some or all embodiments, the opened area between the tongue and the trough section can be configured to receive an end section of the grate that is pivotably associated with a receiver pin of the receiver unit, thereby providing pivotable engagement between the paddle and the receiver unit.

In some or all embodiments, the paddle can include a paddle handle extending out from an area adjacent the tongue in a direction away from the tongue.

Some or all embodiments of the present technology can include a peeling sleeve including a hollow interior configured to slidably receive a receive handle of the receiver unit or a plunger handle of the plunger unit.

Some or all embodiments of the present technology can include the step of positioning the receiver unit on a support surface so that free ends of bosses that extend from the receiver cup, and a planar portion of a receiver handle of the receiver unit are in contact with the support surface.

In some or all embodiments, a portion of the plunger can be made of a more resilient material to that of the receiver cup to produce a tight seal against the receiver cup.

In some or all embodiments, a portion of the plunger can be made of a more resilient material to that of the grate to produce a tight seal against the grate.

In some or all embodiments, the rollers can have a wider outside diameter, serving to support sidewalls of the receiver unit.

In some or all embodiments, the plunger unit can include a plunger handle, and the receiver unit can include a receiver handle. The receiver handle can include a planar portion, and bosses that can extend from the receiver unit. A free end of the bosses and the planar portion can be configured to support the receiver unit on a support surface while positioning the receiver cup spaced apart with the support surface.

In some or all embodiments, the plunger unit can include a plunger handle, and the receiver unit can include a receiver handle. A free end of bosses extending from the receiver cup and the receiver handle can be configured to support the receiver unit on a support surface while positioning the receiver cup spaced apart with the support surface such that farthermost lateral extremities of farthermost downward protuberances of the receiver that describe a plane on which it can be steadied upon the support surface are spaced at a distance greater than ⅔ a distance between the two axes of rotation.

The present technology can add features to improve the functionality of the bearing surfaces. One feature can be portions of plunger hinge guides that can rotate independently of the plunger. Another feature can be a narrow sealing surface that can be proud of the body of the plunger and can be comprised of flexible material. This body can also conceal the cavity within a die-cast body of the plunger and can be retained by a grate held in place by a first pin. A plunger handle can include an upswept portion that positions the user's hand.

There has thus been outlined, rather broadly, features of the present technology in order that the detailed description thereof that follows may be better understood and in order that the present contribution to the art may be better appreciated.

Numerous objects, features and advantages of the present technology will be readily apparent to those of ordinary skill in the art upon a reading of the following detailed description of embodiments of the present technology when taken in conjunction with the accompanying drawings.

As such, those skilled in the art will appreciate that the conception upon which this disclosure is based may readily be utilized as a basis for the designing of other structures, methods and systems for carrying out the several purposes of the present technology. It is proper, therefore, that the claims be regarded as including such equivalent constructions insofar as they do not depart from the spirit and scope of the present technology.

It is therefore an object of the present technology to provide a new and novel double-hinged food press device, system and method that has all of the advantages of the known food presses and none of the disadvantages.

It is another object of the present technology to provide a new and novel double-hinged food press device, system and method that may be easily and efficiently manufactured and marketed.

An even further object of the present technology is to provide a new and novel double-hinged food press device, system and method that has a low cost of manufacture with regard to both materials and labor, and which accordingly is then susceptible of low prices of sale to the consuming public, thereby making such double-hinged food press device, system and method economically available to the buying public.

Still another object of the present technology is to provide a new double-hinged food press device, system and method that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 19 is a cross-sectional view of the double-hinged food press system taken along line 19-19 in FIG. 7 while supported on a support surface and in an exemplary operation.

FIG. 20 is a cross-sectional view of the double-hinged food press system of FIG. 19 while supported on the support surface with the plunger handle being pivoted or rotated about the plunger pin and receiver pin toward the receiver handle to position the rollers in their respective recesses with a foodstuff located in the cavity of the receiver cup cavity.

FIG. 21 is a cross-sectional view of the double-hinged food press system of FIG. 19 while supported on the support surface with the plunger handle being pivoted or rotated about the plunger pin to confine the foodstuff.

FIG. 22 is a cross-sectional view of the double-hinged food press system of FIG. 19 while supported on the support surface with the plunger handle being pivoted or rotated about the plunger pin to operate the plunger to sweep the cavity of the receiver cup and force the foodstuff against the grate and through the perforations of the grate.

The same reference numerals refer to the same parts throughout the various figures.

DETAILED DESCRIPTION OF THE EMBODIMENTS

Figure 1:
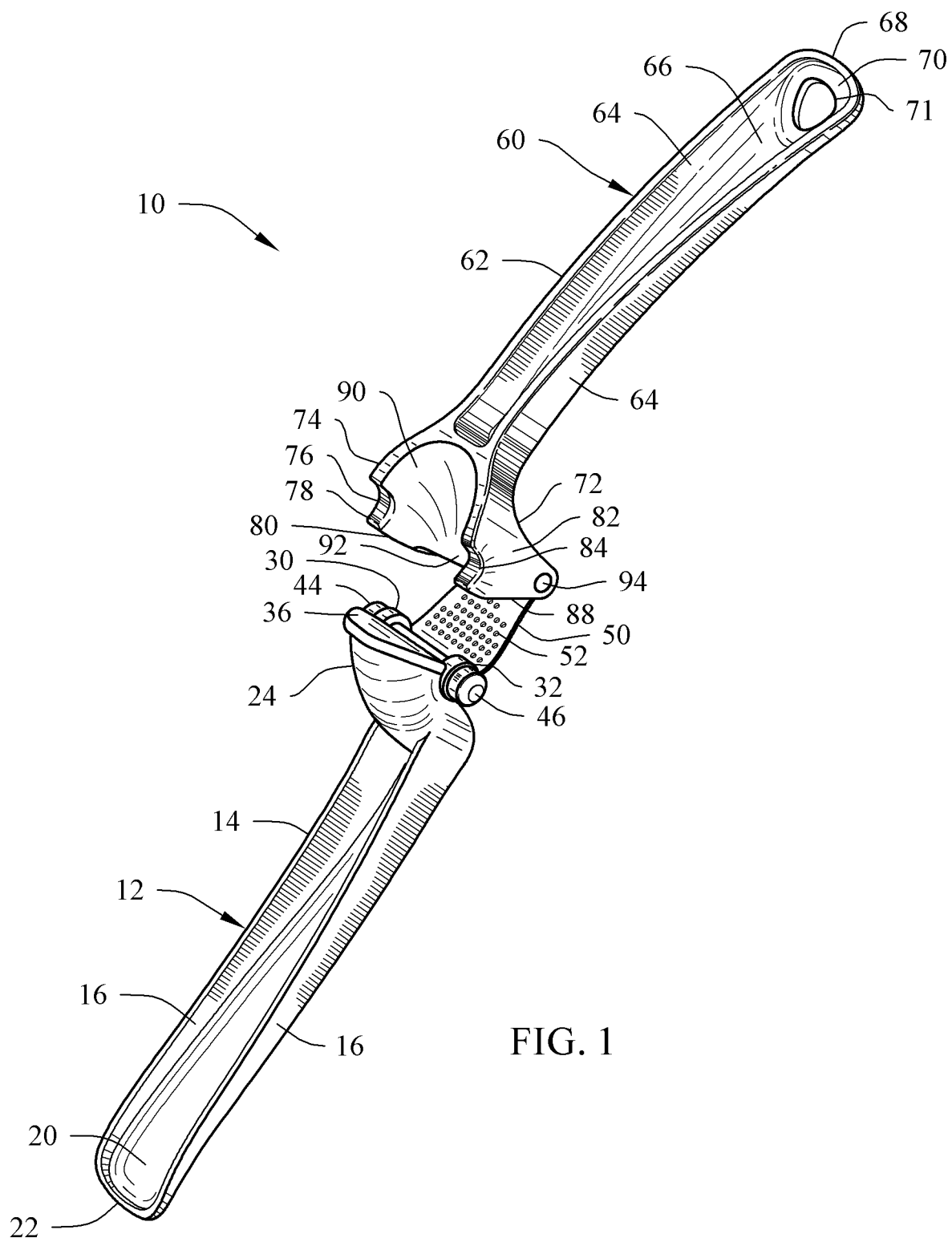
FIG. 1 is a top-right perspective view of an embodiment of the double-hinged food press system in an open configuration and constructed in accordance with the principles of the present technology.

In the following description, for purposes of explanation and not limitation, specific details are set forth, such as particular embodiments, procedures, techniques, etc. in order to provide a thorough understanding of the present technology. However, it will be apparent to one skilled in the art that the present technology may be practiced in other embodiments that depart from these specific details.

The Applicant has identified some of the following drawbacks of known hand-operated presses. Some of these known presses advance a crushing piston by rotation of a threaded rod, which is time-consuming to operate.

Other known presses utilize a right-angle cylinder as a receptacle in which the foodstuff is to be pressed, and thus employ a piston that is pivotally mounted on a handle in order to compensate or adjust the arcuate motion of the handle to the linear configuration of the receptacle. This assembly results in misalignment of the piston with the receptacle, thereby allowing material to escape.

Still other known presses are based on the use of a lever arm to force a piston into a cup or receiver and extrude crushed garlic through a perforated grate or screen. A ram or piston is forced into the cup, pressing the garlic through holes in a perforated grate or sieve. A handle is operated, typically by hand in a squeezing motion, that utilizing mechanical advantage to operate the ram or piston.

However, these known presses include corners and crevices which retained sticky, fibrous residue from the crushed garlic. In particular, the perforated grate through which the juice was pressed was difficult to clean because of its inherent intricacy and its location at the bottom of a cup. Also, its interior surface joined the interior of the cup at right angles, creating an inaccessible crevice. Using this type of known press results in crushed garlic being forced backwardly around the periphery of the piston as the piston is forced through the interior of the cup toward the grate.

A solution to the problem of cleaning the grate was to make it detachable. However, detachable grates were retained by crevices in the cup which made the cup no less difficult to clean. Also, the detached grates were difficult to hold for cleaning and were easy to lose.

One solution to this disadvantage in known presses was to provide combs or protrusions, which, when inserted into the grate, served to dislodge residue. However, this solution added to the cost and complexity and was nearly as hard to clean as the grates themselves had been. Also, some of these combs were separate and hence, easy to lose.

Another common problem with known presses was that the plunger did not slide sufficiently tightly into the cup. This allowed food material to escape pressing and to make a mess. The reason for this imprecision was that the presses were made of plastic or metal that was cast or drawn in a die. In order for the parts to be removed from the die without undue friction, they were tapered in such a way that surface-to-surface contact between the parts and the die was eliminated as soon as the dies were parted. When the plunger and cup were assembled, their relationship resembled their former relationships to the dies, so that the taper prevented proper surface-to-surface seal until the mechanism reached the end of its travel.

Applicant has identified that these known garlic presses currently available are inefficient and un-ergonomic, making them difficult to use.

When pressing garlic or the like, it is desirable to thoroughly constrain the raw material, ensuring that as much as possible is crushed by being pushed through a grate, allowing little to escape elsewhere to create a mess. Upon completing the operation, it is desirable that the residue, contained in one place, be exposed for ease of cleaning.

One solution of known double-hinged presses was to produce a tight fit of the plunger in the receiver by arranging for the plunger to swing in an arc roughly perpendicular to the direction of draft. However, it relied on unusually tight tolerances to ensure a tight seal. As surfaces of the plunger swept past the receiver, they wore, creating gaps. As the plunger snapped in and out of a detent in the receiver, the locating surfaces wore. The axes of the plunger and receiver might then no longer coincide, and the detent might not even hold the grate in place to capture the workpiece. Furthermore, the design of this known double-hinged press was not well adapted to employ the user's weight as a compressive force.

Wear issues may be solved by choices of materials, but other problems are thereby created: Aluminum has been the preferred material for hand-presses due to its lightness, stiffness, corrosion resistance, low cost and castability. However, if the plunger and receiver were both made of aluminum, the two parts would gall where they came in contact. Surface treatment such as nitriding or Physical Vapor Deposition (PVD) could prevent that, but is prohibitively expensive. Plastics are an alternative, but lack the preferred stiffness. Glass filling adds stiffness, but at the expense of a clean surface texture. Metal stiffeners would also add cost.

Another example of a known food press utilizes a flexible ring to seal the edges of the plunger against the walls of a chamber in the form of a toroidal segment. However, this design poses production problems: If it is molded or cast, the mold would have to close in an arc, requiring a special mold with a custom mechanism. Furthermore, it would have to have draft, in which case the form would be a curved cone rather than a toroidal segment. The flexible seal would be compressed as it travelled towards the bottom of the chamber, increasing resistance, wear and required force. Alternatively, it could be machined by a spherical cutter traveling in an arc, but that would be expensive and require a ball-end plunger and a difficult-to-clean hemispherical grate, or it would require that a flat grate be installed after the machining operation.

In some cases, users with reduced hand strength may wish to augment muscle power with the force of their body weight. Traditional garlic presses direct the product straight down, which is convenient when the press is held over a jar or pot, but precludes it easily being pressed down against a convenient support surface such as a countertop. Some known garlic presses enable the user to exert pressure against a support surface, but position small built-in reservoirs beneath the grate. These are awkward devices having more parts to clean and to monitor. They are unergonomic, providing little support or guidance for the user.

One known press providing a reservoir beneath the grate cradles the user's hand with a flared plunger lever, but it is designed to sit on a support surface only when the levers extend directly upwards, so the flare doesn't serve to resist gravity. Another known garlic press design pushes the garlic up from under the grate, so it can be pressed against a support surface, but it is still difficult to clean.

Other examples of known garlic presses employ a double-hinged concept, though without realizing the advantages of sealing or ease of cleaning made possible by the present technology. These known presses have grates positioned at an angle so that the product is extruded ahead of the press. Such presses can be pressed against plates, trays, or cutting boards so the product can then be scraped into jars or pots.

Even further examples of known presses have features on the underside that stabilize the press and keep it from falling over when in use, but none safely position the hand to prevent it from sliding off and possibly causing injury to a feeble user.

Applicant has identified that one of the disadvantages and problems with these known presses is that they are not precise and durable. They further present a cavity that is hard to clean, and the known presses are not optimized for use on support surfaces.

While the above-described devices fulfill their respective particular objectives and requirements, the aforementioned devices or systems do not press foodstuff as effectively and durably as needed and can be difficult to operate and clean.

Having regard to the foregoing, a need exists for a new and improved double-hinged food press device, system and/or method. In this respect, as will be explained more adequately herein, the double-hinged food press device, system and method according to the present technology mitigates at least some of the drawbacks of the aforementioned devices or systems.

Figure 53:
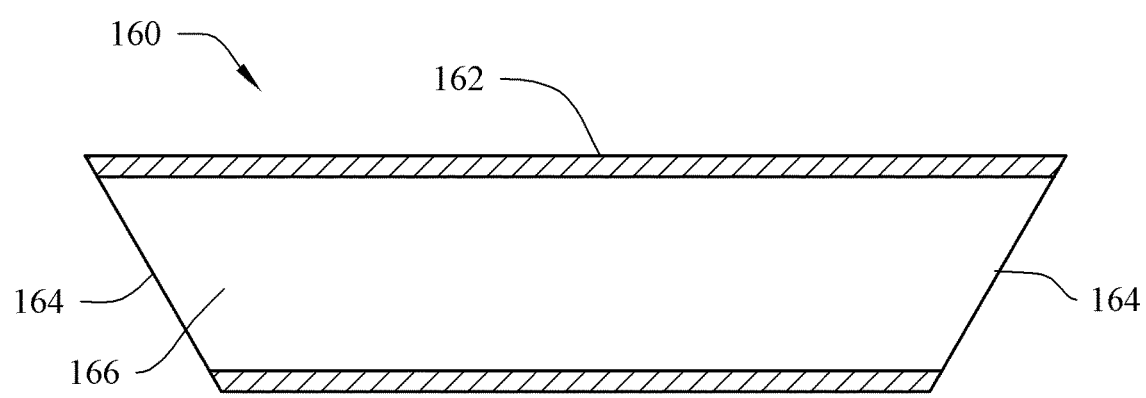
FIG. 53 is a cross-sectional view of the sleeve.

Referring now to the drawings, and particularly to FIGS. 1-53, an embodiment of the double-hinged food press device, system and method of the present technology is shown and generally designated by the reference numeral 10, where the drawings are representational of embodiments of the present technology and need not be to scale in any and all figures.

In FIGS. 1-8, a new and novel double-hinged food press device, system and method 10 of the present technology for pressing foodstuff more effectively and more durably, one that is easier to operate and easier to clean, is illustrated in an open configuration and will be described. More particularly, the double-hinged food press device and/or system 10 can include a plunger unit 12, a grate 50 and a receiver unit 60, with the plunger unit 12 being pivotably associated with a first end of the grate 50, and the receiver unit 60 being pivotably associated with a second end of the grate 50, thereby providing a double-hinged food pressing device and/or system.

In the exemplary, the plunger unit 12 and the receiver unit 60 may be, but are not limited to, plastics, alloys, zinc, brass, bronze, stainless steel or titanium. Alternatively, the plunger unit 12 and the receiver unit 60 may comprise multiple parts assembled together to form their respective assemblies.

The plunger unit 12 can include an ergonomically configured plunger lever or plunger handle 14 extending from a plunger 24. The plunger handle 14 can include a pair of sidewalls 16 extending from a plunger handle wall 20, all terminating at a plunger handle free end section 22. The sidewalls 16 can perpendicularly extend away from opposite sides of the plunger handle wall 20, respectively, to provide a plunger handle 14 with an open channel or generally U-shaped configuration defining an open internal cavity between the spaced apart sidewalls 16. It can be appreciated that the sidewalls 16 may extend at angles other than perpendicular, or may be curved or rounded to provide an open channeled oval-like configuration. The sidewalls 16 can include a height greatest near the plunger 24 and narrowest near the free end section 22, accordingly, providing a tapering sidewall configuration, as best illustrated in FIGS. 1, 2, 5 and 6.

Figure 3:
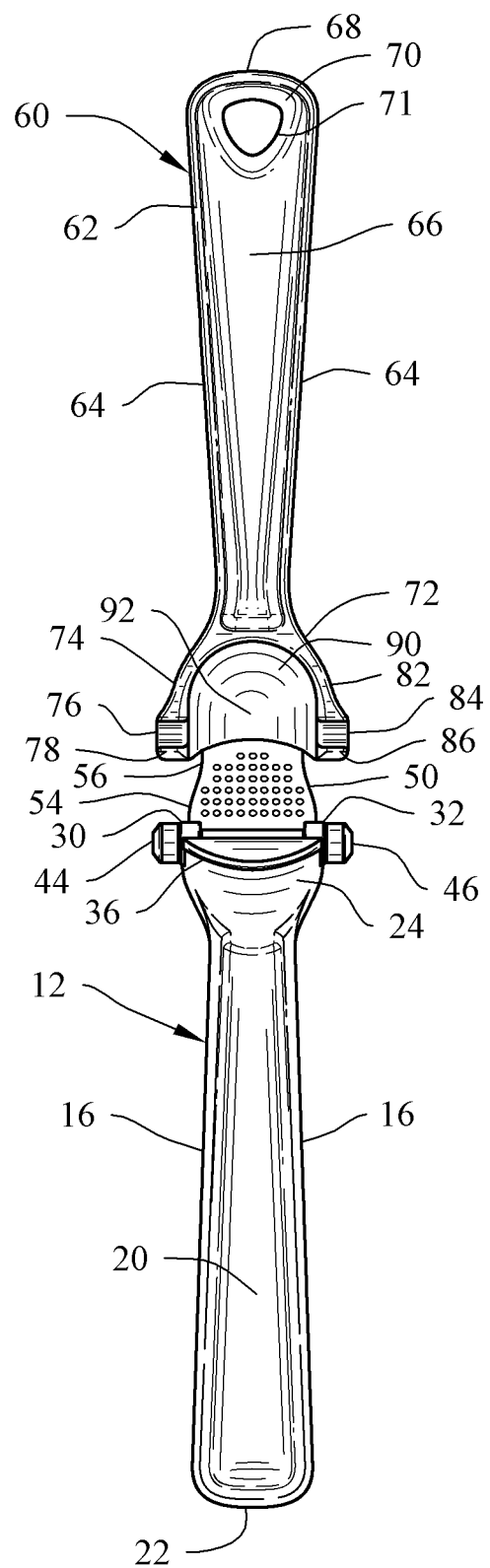
FIG. 3 is a top plane view of the double-hinged food press system in the open configuration.
Figure 4:
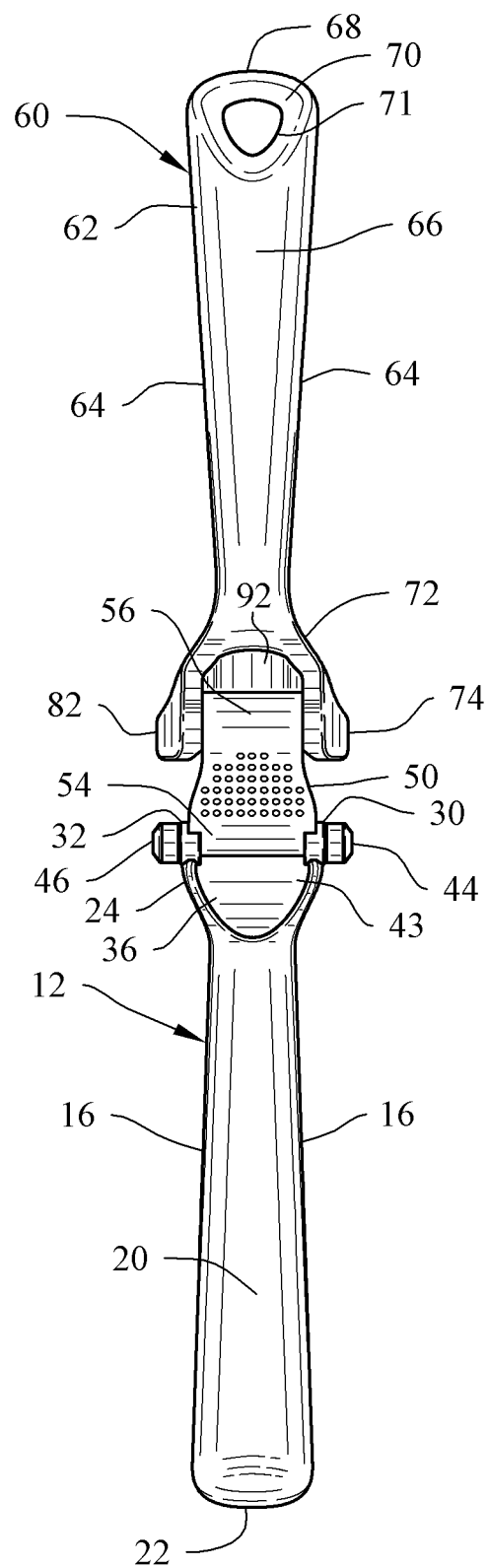
FIG. 4 is a bottom plane view thereof of the double-hinged food press system in the open configuration.
Figure 8:
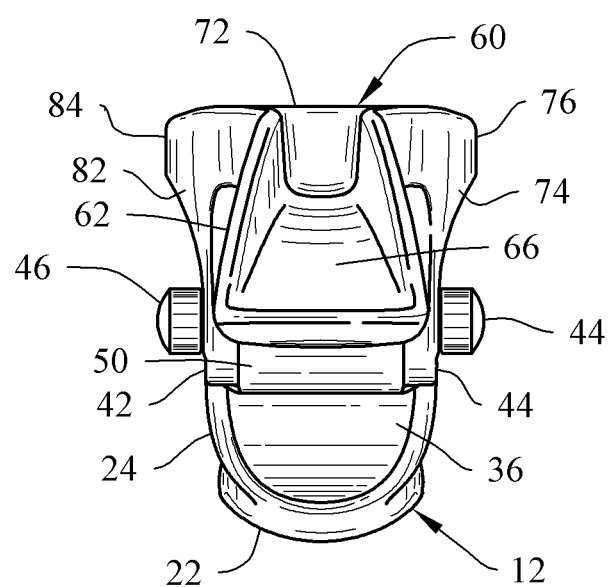
FIG. 8 is a rear-end view of the double-hinged food press system in the open configuration.

A distance between the sidewalls 16 can be narrowest near the plunger 24 and greatest near the free end section 22, accordingly, providing a tapering configuration that converges toward the plunger 24, as best illustrated in FIGS. 3, 4 and 8. It can be appreciated that the distance between the sidewalls 16 can be constant along a majority of a length of the plunger handle 14, or can vary along the length of the plunger handle 14 providing an undulating or sinusoidal-like configuration.

The plunger handle wall 20 can be substantially flat, planar, curved or arcuate. The sidewalls 16 and/or the plunger handle wall 20 can include ridges, grooves, texturing, padding, attachments and the like to improve manipulation and/or gripping of the plunger handle 14 by a user's hand, foot, footwear or weighted object placed thereon.

The free end section 22 can curve away from the plunger handle wall 20 in a direction opposite or away from the sidewalls 16, as best illustrated in FIGS. 1, 2, 5 and 6. This curvature of the free end section 22 provides an ergonomic feature of the plunger handle 14 when grasped by a hand of a user, and may reduce the likelihood of the hand slipping or sliding off the plunger handle 14 when in operation, since this curvature of the free end section 22 may act as a stopping ledge against the user's hand. It can be appreciated that a tool, such as, but not limited to, a screwdriver, a utensil or shaft can be inserted through an opening defined through the plunger handle wall 20 or the free end section 22, and used as additional leverage in operating or pressing the plunger handle 14.

Figure 2:
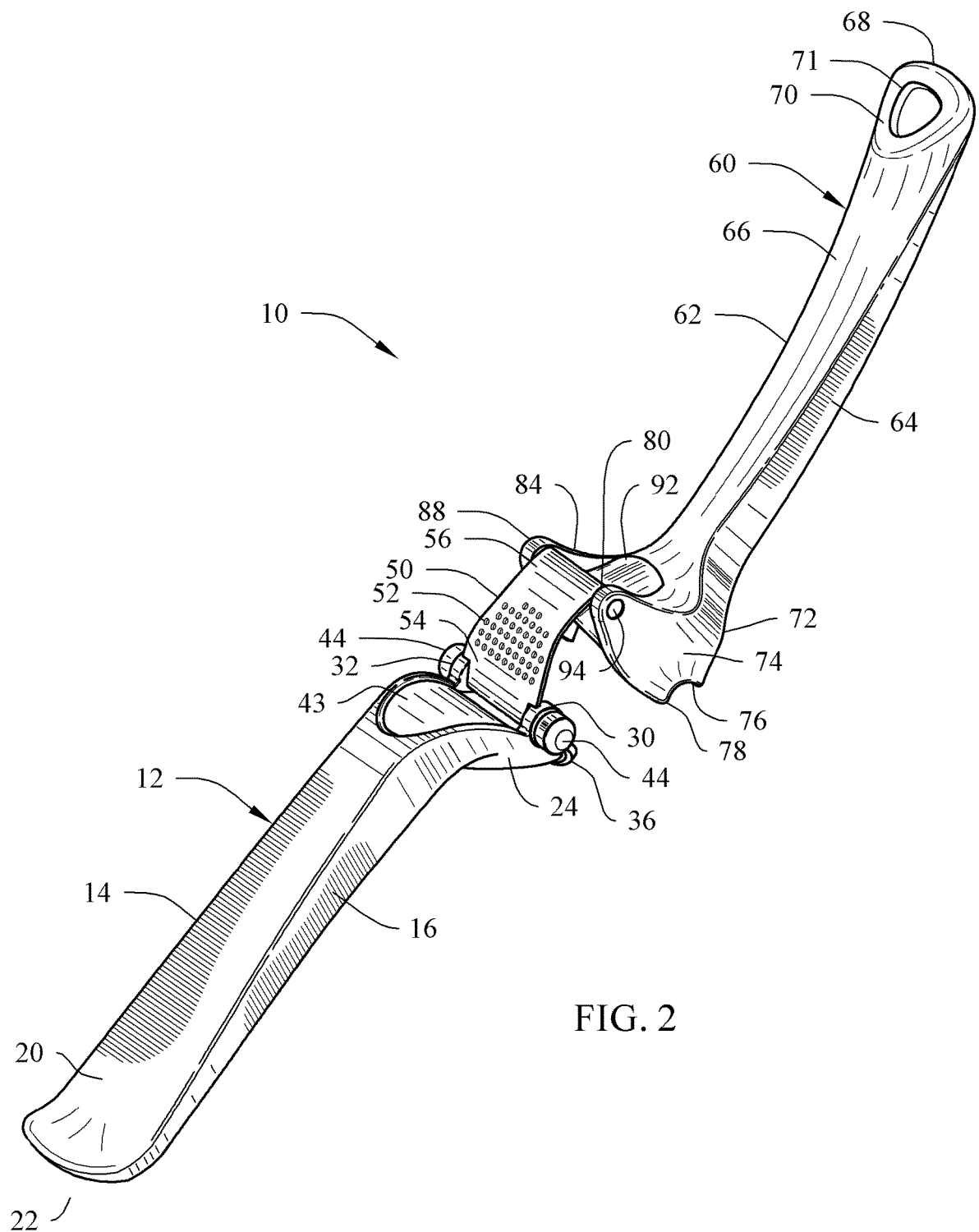
FIG. 2 is a bottom-left perspective view of the double-hinged food press system in the open configuration.
Figure 5:
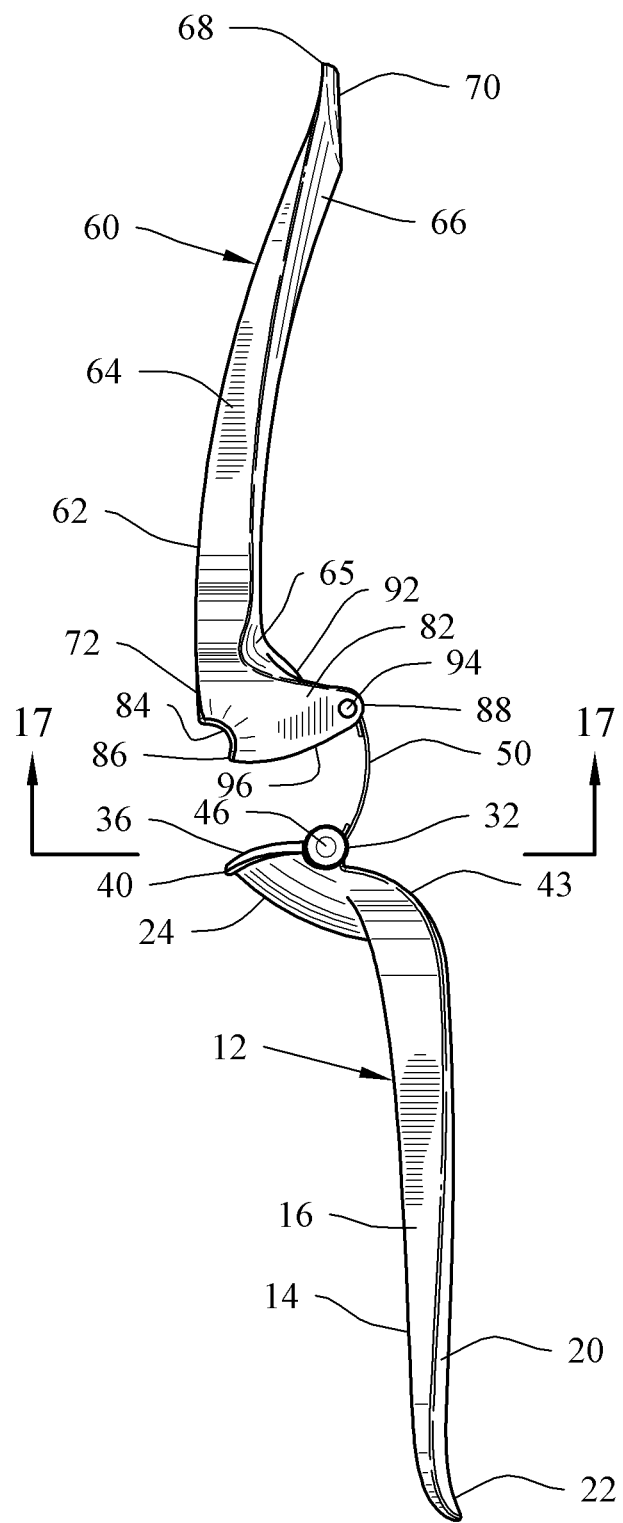
FIG. 5 is a right-side view of the double-hinged food press system in the open configuration.
Figure 6:
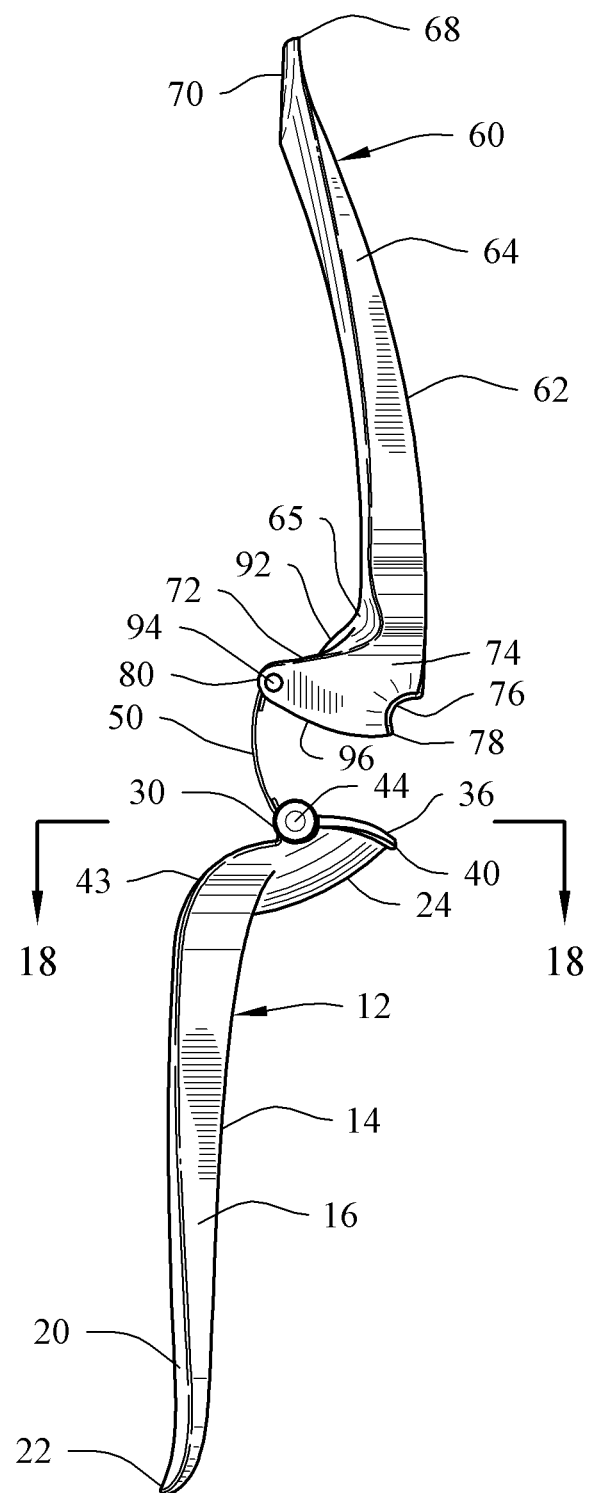
FIG. 6 is a left-side view of the double-hinged food press system in the open configuration.
Figure 7:
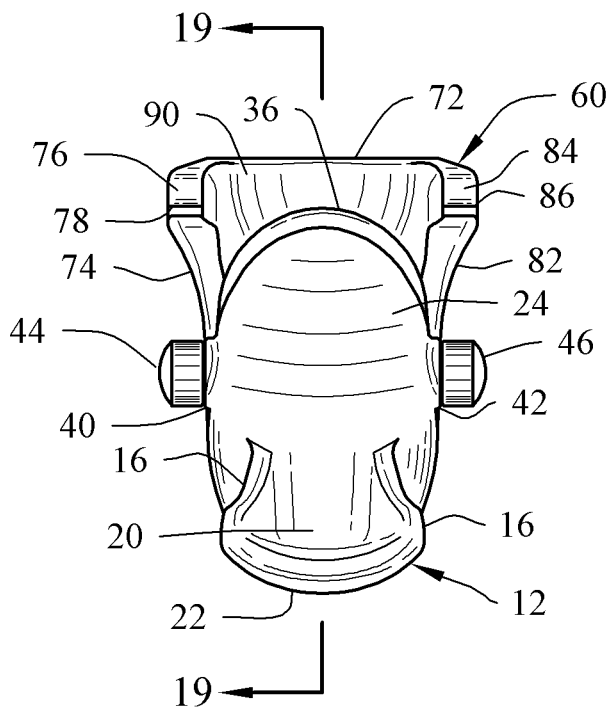
FIG. 7 is a front-end view of the double-hinged food press system in the open configuration.

Taking into account a longitudinal profile of the plunger handle 14, a free edge of the sidewalls 16 can define a curvature at an area near the plunger 24 or along a majority of its longitudinal length that is opposite to that of a curvature at an area near the free end section 22. A section of the sidewalls 16 and the plunger handle wall 20 near the plunger 24 can curve towards the plunger 24 in a direction opposite the free end section 22, as best illustrated in FIGS. 2, 5 and 6. This section of the sidewalls 16 near the plunger 24 can further curve away from each other as they transition with the plunger 24, as best illustrated in FIGS. 2-4, thereby creating a widening section of the sidewalls 16 and the plunger handle wall 20 near the plunger 24.

Figure 9:
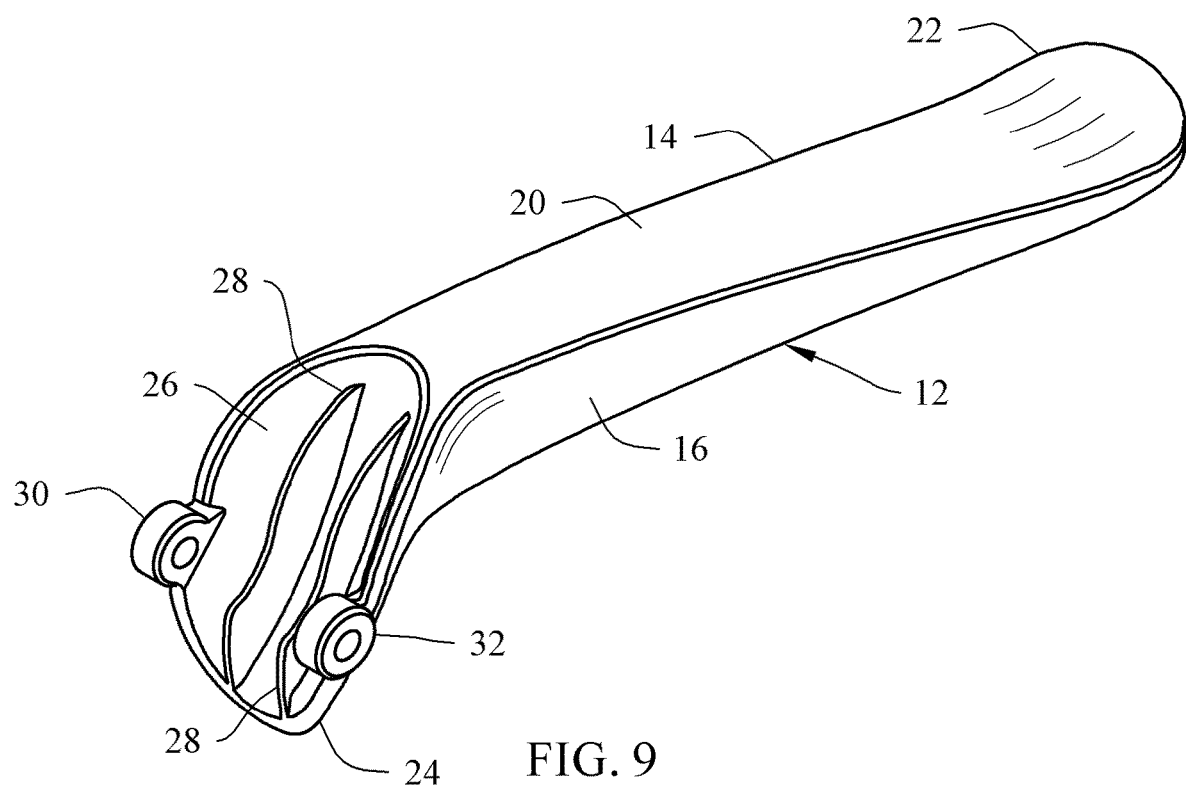
FIG. 9 is a perspective view of an embodiment of the plunger unit.
Figure 10:
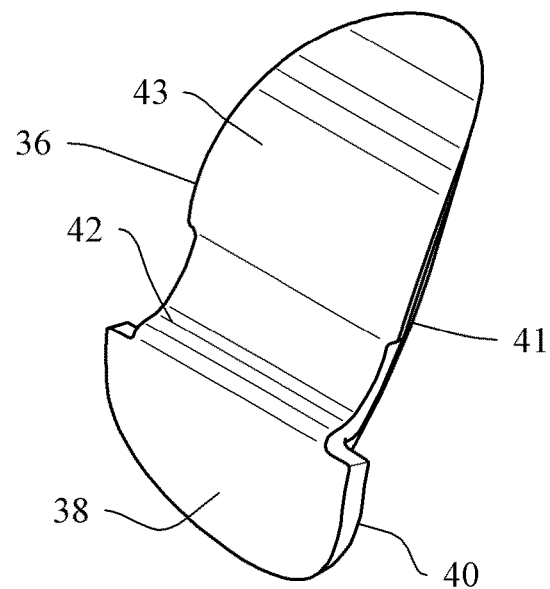
FIG. 10 is a perspective view of the plunger seal insert.

In an alternative, the plunger 24 can include an integrally-formed seal lip configured to sweep the receiver cup, or can include an attachable plunger seal insert 36 as best illustrated in FIGS. 9 and 10

The plunger 24 can include a plunger cavity 26, one or more plunger ribs 28 as best illustrated in FIG. 9. The plunger 24 can have a semi-ovoid configuration with a curved or arcuate cross-sectional profile on its lateral and/or longitudinal axis, as best illustrated in FIGS. 1, 3, 5 and 6. A portion of the plunger 24 can extend into the interior cavity between the sidewalls 16, as best illustrated in FIGS. 1, 3 and 8. The widening section of the sidewalls 16 can smoothly transition to sides of the plunger 24, respectively. Accordingly, this widening section of the sidewalls 16 would match a widening lateral profile of the oval-like plunger 24.

A pair of plunger hinge guides 30, 32 can extend out from sides of the plunger 24 or from the plunger handle 14. It can be appreciated that a distance between the plunger hinge guides 30, 32 can be less than, the same or greater than a width of the plunger handle 14. The plunger cavity 26 is defined between the plunger hinge guides 30, 32. The plunger cavity 26 can define an opening adjacent the plunger handle wall 20 and along the entire front face of the plunger 24, as best illustrated in FIG. 9.

A portion of the plunger cavity 24 can follow the curvature of the section of the plunger handle wall 20 near the plunger 24, and can extend toward or transition with a plunger front side 38 of the plunger 24.

As best illustrated in FIG. 10, the plunger seal insert 36 is configured to be attachable to the plunger 24, with a portion of the plunger seal insert 36 being receivable in the plunger cavity 26. The plunger seal insert 36 can include a compression wall or plunger front side 38 featuring a seal lip 40, a central recess or channel 42, a cavity cover or rear side 43, and one or more plunger seal ribs 41. The plunger seal insert 36 can be made of, but not limited to, nylon, Delrin®, polypropylene, Santoprene™, or any other forgiving non-porous material. The plunger seal insert 36 can be fixed immovably in place upon the plunger 24 solely by the pressure of the grate 50 around which it rotates. The plunger seal insert 36 may be replaced by two or more different parts, sealing different areas. In some embodiments, the plunger 24 and plunger seal insert 36 may be molded as a single part with different material properties, co-molded or otherwise.

The plunger front side 38 can have a curved or arcuate profile generally opposite to that of the plunger 24, consequently resulting in the plunger 24 and the plunger front side 38 converging at a location opposite the cavity cover 43 when the plunger seal insert 36 is assembled with the plunger 24. In the alternative, it can be appreciated that the plunger front side 38 can be substantially flat or planar, thereby providing a flat plunger face that is utilized to contact foodstuff or an object to be pressed, or can include a curved or arcuate cross-sectional profile along its lateral and/or longitudinal axis, consequently resulting in the plunger 24 and the plunger front side 38 converging along their lateral edges to create a generally circular or oval lateral perimeter edge.

The seal lip 40 can be provided along the C-shaped perimeter edge of the plunger front side 38, and can extend out therefrom. It can be appreciated that the seal lip 40 can be a separate lip that is attachable to the plunger front side 38, and can be made from a material different to that of the plunger seal insert 36.

The cavity cover 43 can be configured to cover any remaining portion of the plunger cavity 26 not covered by the front side 38 and central channel 42. The plunger cavity 26 and accordingly the cavity cover 43, when assembled, can extend in the plunger handle 14 and more specifically into the plunger handle wall 20. The cavity cover 43 can have an arcuate configuration that curves away from the central channel 42 in a direction opposite to that of the front side 38.

The plunger seal ribs 41 can extend from an interior side of the front side 38 and/or the cavity cover 43, and can have a free edge profile that matches the profile of the plunger cavity 26. Additionally, or in the alternative, the plunger ribs 28 can extend from an interior side of the plunger 24 into the plunger cavity 26, and can have a free edge profile that matches the profile of the interior side of front side 38, the central channel 42 and/or the cavity cover 43.

Taking into account a longitudinal profile of the plunger unit 12 with the plunger hinge guides 30, 32 as a reference point, it can be appreciated that the plunger handle 14 extends in a direction away from the plunger 24 opposite to that of the plunger hinge guides 30, 32.

Figure 11:
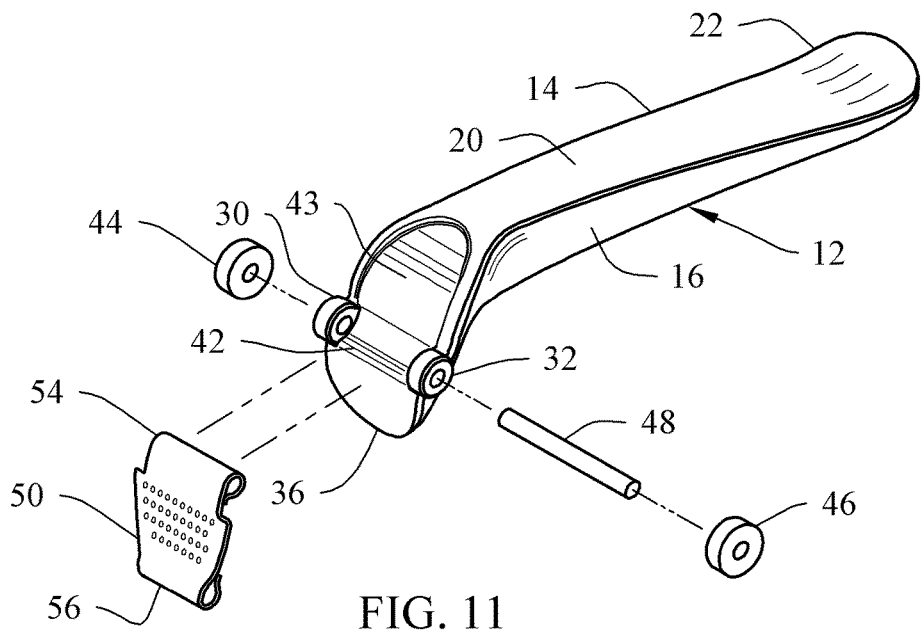
FIG. 11 is a semi-exploded perspective view of the plunger unit engaged with the plunger insert, but separated from the plunger pin, the grate and the rollers.
Figure 12:
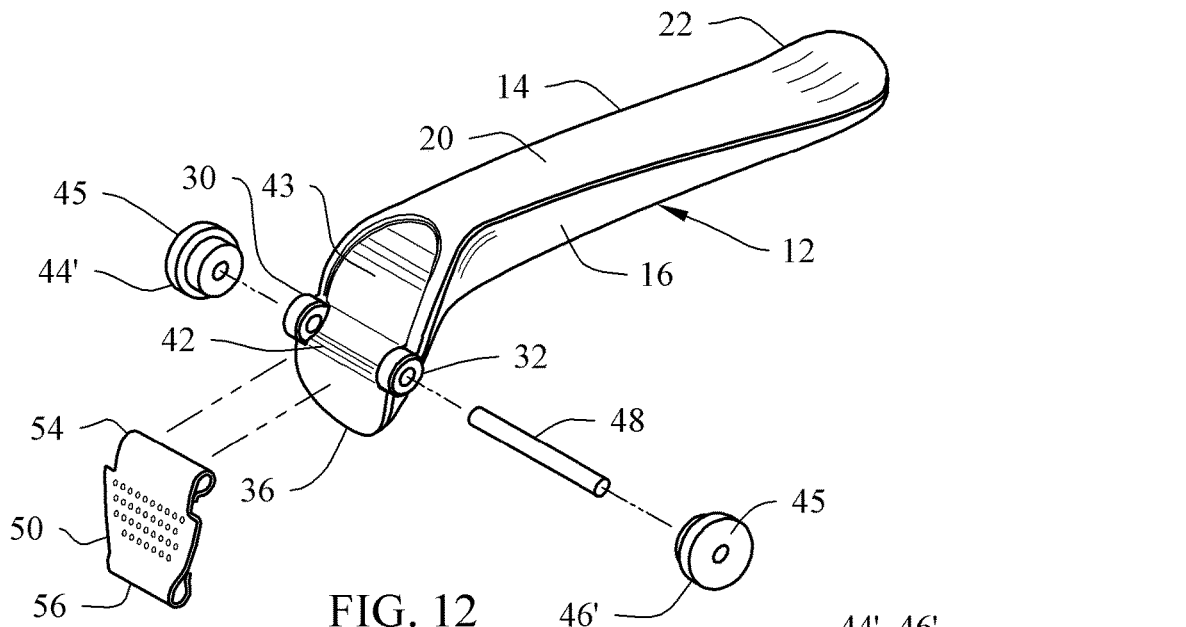
FIG. 12 is a semi-exploded perspective view of the plunger unit engaged with the plunger insert, but separated from the plunger pin, the grate and the flanged rollers.
Figure 14:
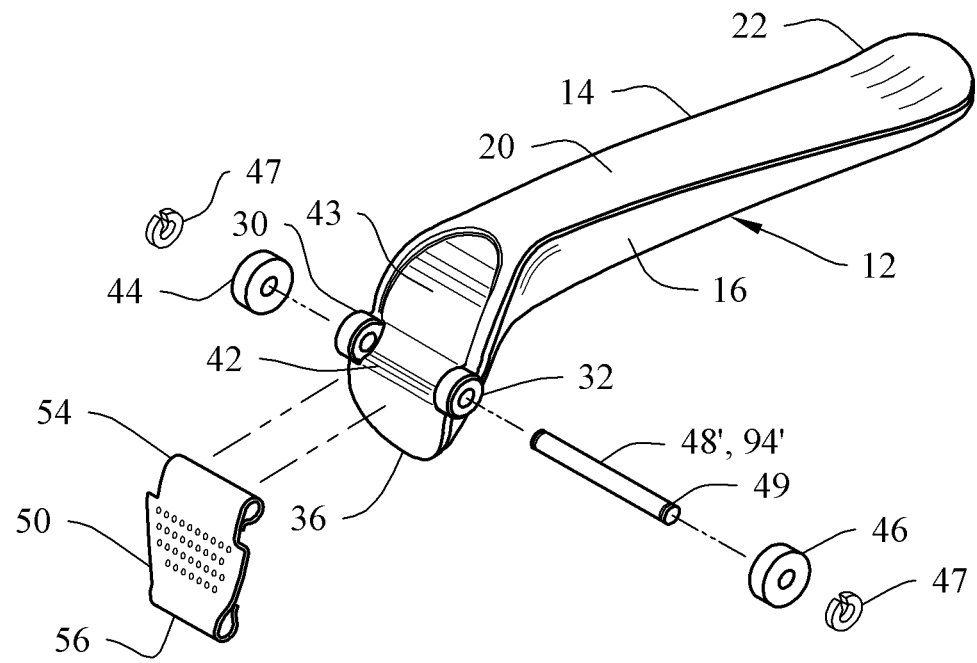
FIG. 14 is a semi-exploded perspective view of the plunger unit engaged with the plunger insert, but separated from the rollers utilized with the alternate embodiment plunger pins and clips.

A plunger pin 48 or other suitable mechanical means, as best illustrated in FIGS. 11, 12 and 14, can pass through a recess, notch, opening or bore defined in or through each of the plunger hinge guides 30, 32. The plunger pin 48 may take a variety of forms, including, but not limited to the following: a spring pin, a roll pin or flared tubing. It can accept rivets, or can be threaded internally to accept screws. It can have external annular grooves to accept spring clips. It can be affixed to the hinge guides or to the grate or to the rollers. The plunger pin 48 can be a pair thereof, inserted from both ends. The pair can comprise a barrel bolt, with male threads on one part mated to female threads on the other part. The plunger pin 48 can be a pair of shoulder bolts, screwed into threaded bores in the hinge guides 30, 32 such that the rollers 44, 46 may ride on their shoulders. The plunger pin 48 can be swaged, splined, knurled, threaded outside or otherwise deformed so as to bond more effectively with the hinge guides 30, 32.

A first roller 44 can be rotatably associated with one end of the plunger pin 48 on an exterior side of a first hinge guide 30, and a second roller 46 is rotatably associated with another end of the plunger pin 48 on an exterior side of a second hinge guide 32. Accordingly, the rollers 44, 46 are exterior of their respective plunger hinge guides 30, 32. A distance between the rollers 44, 46 can be greater than the width of the plunger 24 and/or the plunger seal insert 36. In the exemplary, the rollers 44, 46 can rotate freely on the plunger pin 48, or they can be fixed to the plunger pin 48 so that the plunger pin 48 rotates with the rollers 44, 46, with the plunger pin 48 rotatable in the recess, notch, opening or bore defined in or through each of the plunger hinge guides 30, 32, as best illustrated in FIG. 11. The rollers 44, 46 may be held in place by peening the ends of the plunger pin 48, respectively, or by threading arrangement, or they may be held by clips fitting into annular grooves defined in the plunger pin 48, or by bearings fittable to the plunger pin 48.

In some embodiments, the rollers 44, 46 can be immovably pressed onto the fixed plunger pin 48, respectively. The rollers 44, 46 may be pressed on, swaged on, glued on, screwed on, pinned on, or otherwise fixed. They may be easily removable to replace the grate 50 that has been damaged or one that has undesirable hole characteristics.

Alternatively, the rollers 44, 46 can be rotatably fitted or associated directly with sides of the plunger 24 or to the sidewalls 16 of the plunger handle 14, respectively, and not being associated with the plunger pin 48.

Figure 13:
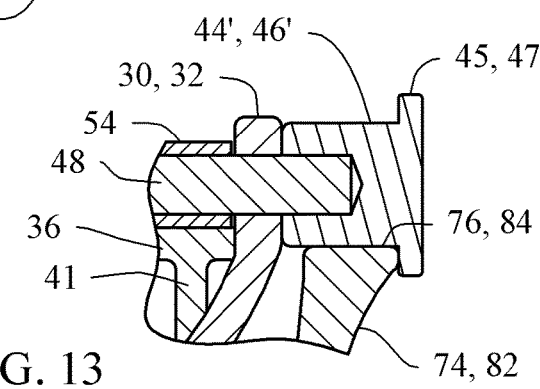
FIG. 13 is partial cross-sectional view of one of the flanged rollers resting in its recess with the annular flange exterior thereof.

In the exemplary and as best illustrated in FIGS. 12 and 13, the rollers can be flanged rollers 44', 46' provided with annular ridges 45 that protrude alongside exterior walls of the first and second receiver guides 74, 82 of the receiver cup 90 when in operation. This serves to brace the walls or the receiver guides 74, 82 against expansion and/or distortion that may be caused by pressure from the compressed object or foodstuff 4, which might be an issue if the receiver 72 were made of thin metal or flexible plastic, as best illustrated in FIG. 13. The annular ridges 45 can be configured to support the receiver cup 90 against lateral deformation during a pressing operation because the exterior sides of the area of the receiver guides 74, 82 that defines the recesses 76, 84 would press against the interior sides of the rollers 44', 46', and thereby be prevented from further splaying.

Further in the exemplary and as best illustrated in FIG. 14, an alternative plunger pin 48' and/or the receiver pin 94' can include annular grooves 49 configured to receive or be fitted with spring clips 47. The spring clips 47 retain the rollers 44, 46 rotatably adjacent the hinge guides 30, 32, respectively.

Figure 15:
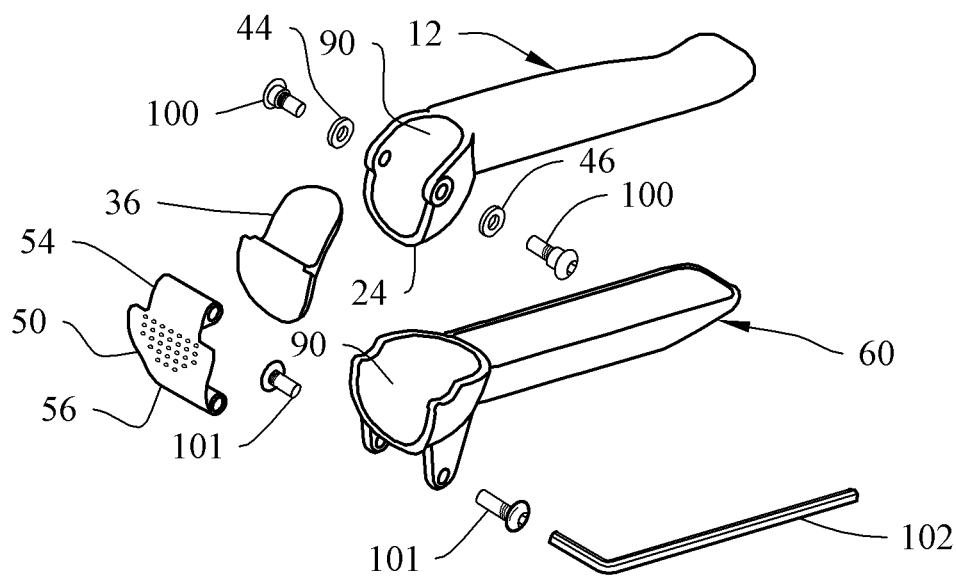
FIG. 15 is an exploded perspective view of the press assembly showing the rollers utilized with the screw pins, including a wrench for assembly thereof.
Figure 16:
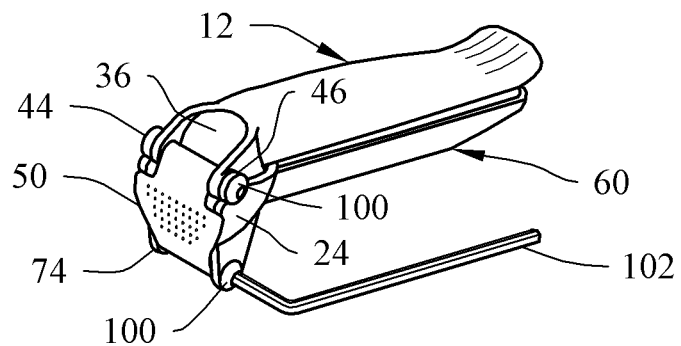
FIG. 16 is an assembled perspective view of the press assembly and wrench showing the rollers utilized with the screw pins of FIG. 15.

Referring to FIGS. 15 and 16, the rollers 44, 46 may be secured by shoulder bolt pins 100 featuring a bearing surface adjacent the screw head, then a threaded section, and lastly a smooth screw shaft or pin section. In this embodiment, the threaded section of the shoulder bolt pins 100 can be engageable with an internal thread section of the bores in the hinge guides 30, 32, so that the rollers 44, 46 can be located on the bearing surfaces between the screw head and the hinge guides 30, 32, respectively. When assembled, the pin section of the shoulder bolt pins 100 can have length so that they extend toward each other to create an assembled plunger pin that are receivable through opposite sides of the first end section 54 of the grate 50. Grate 50 may be secured to plunger 60 by screw pins 101 featuring a threaded section adjacent the screw head, and a smooth screw shaft or pin section. The threaded section of the screw pins 101 can be engageable with an internal thread section of the bores in the hinge guides 80, 88. When assembled, the pin sections of the screw pins 101 can have a length so that they extend toward each other to create an assembled plunger pin receivable through opposite sides of the second end section 56 of the grate 50. A tool 102 can be utilized to fasten or unfasten the shoulder bolt pins 100 and/or the screw pins 101.

Figure 17:
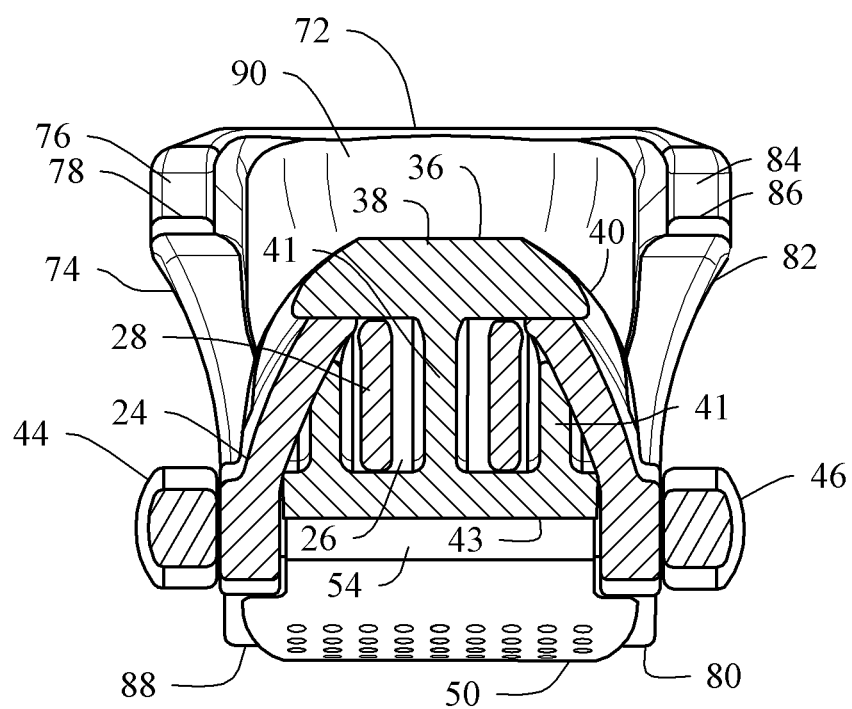
FIG. 17 is a cross-sectional view of the plunger and the plunger seal taken along line 17-17 in FIG. 5 and illustrating the plunger ribs and the plunger seal ribs.
Figure 18:
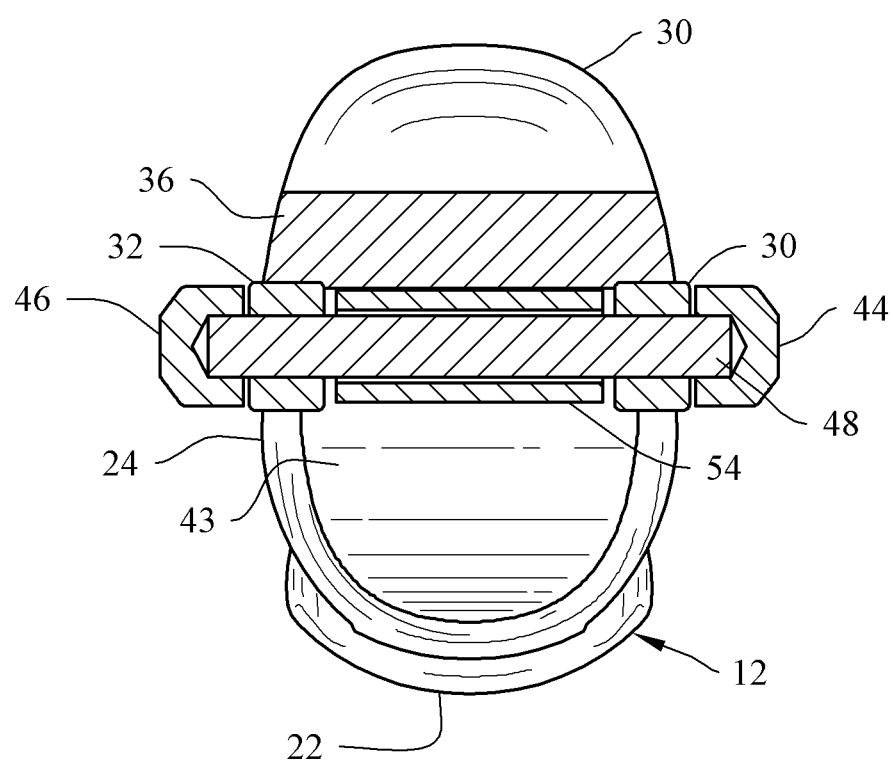
FIG. 18 is a cross-sectional view of the plunger, the plunger seal, the grate, the plunger pin and the rollers taken along line 18-18 in FIG. 16.
Figure 25:
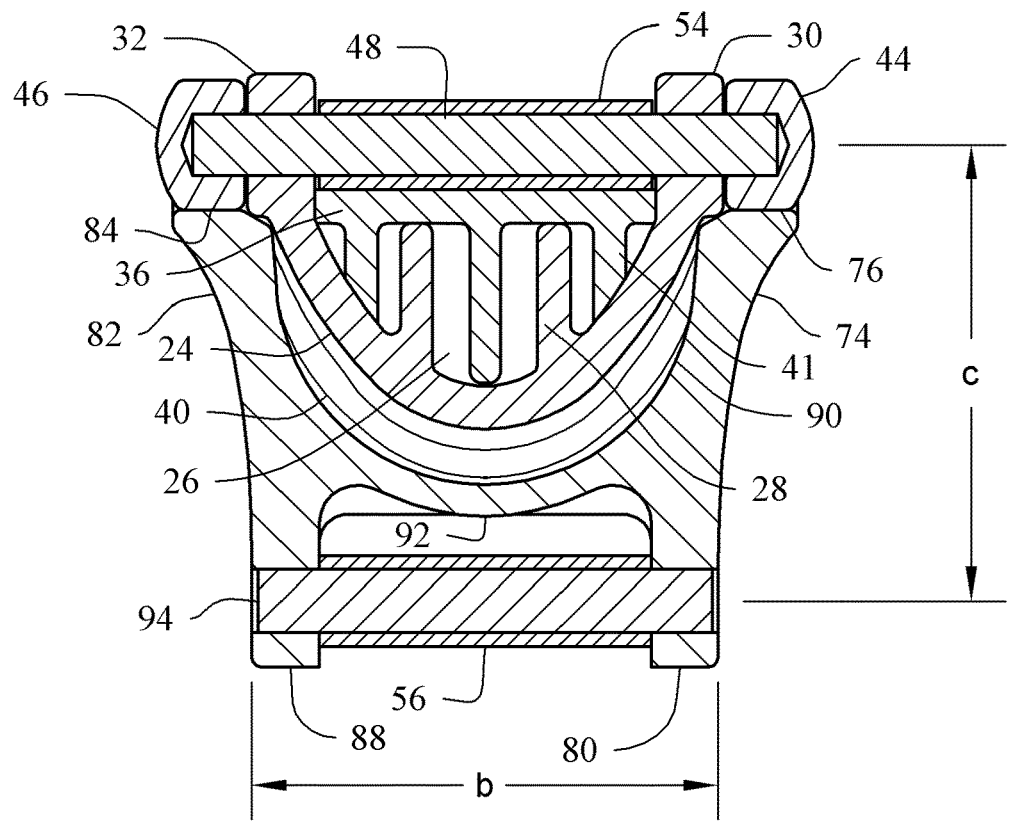
FIG. 25 is a cross-sectional view of the plunger ribs, the plunger seal ribs, the receiver guides and the rollers resting in their respective recesses taken along line 25-25 in FIG. 24.

As best illustrated in FIGS. 17, 18 and 25, with the plunger seal insert 36 fitted or assembled with the plunger 24, it can be appreciated that the plunger ribs 28 and the plunger seal ribs 41 are in juxtaposition. Free ends of the plunger ribs 28 can be in contact with an internal side of the plunger front side 38, and free ends of the plunger seal ribs 41 can be in contact with an internal side of the plunger 24 that defines the plunger cavity 26. The ribs 28, 41 are configured to strengthen and stiffen the plunger 24 and the plunger seal insert 36.

This plunger seal insert 36, which can serve as the face of the plunger 24, is held in place against the back of the plunger 24 by the barrel or first end section 54 of the grate 50, which in turn is held by the plunger hinge guides 30, 32. The extremities of the plunger seal insert 36 are pressed against the back of the plunger 24, and prevented it from rotating about the plunger pin 48.

The grate 50 can include a plurality of perforations 52 configured to allow foodstuff or other material to pass therethrough when pressed thereagainst. The grate 50 can have a curved or arcuate configuration, which can correspond with the profile of the plunger front side 38. The grate 50 is made of springy material, flexing to enable the distance between the receiver pin 94 and plunger pin 48 to expand, allowing rollers 44 and 46 to surmount risers 78 and 86, then to contract, drawing said rollers into the recesses 76 and 84. The grate 50 includes a first end section 54 and a second end section 56, as best illustrated in FIGS. 2 and 4. The first end section 54 can be snapped, secured, coupled, wrapped or otherwise rotatably associated with the plunger pin 48. Consequently, the first end section 54 of the grate 50 can be rotatable with or about the plunger pin 48. It can be appreciated that the first end section 54 can be removable from the plunger pin 48, allowing for the grate 50 to be interchanged with other grates.

When assembled, the central channel 42 of the plunger seal insert 36 can be configured to receive a portion of the narrowed width section of the first end section 54 of the grate 50, as best illustrated in FIGS. 11, 12, 14 and 19-22. The central channel 42 is tight against the first end section 54, allowing for free rotation of the grate 50 about the axis of the plunger pin 48, while the close proximity of the grate with plunger seal insert prevents escape of foodstuff.

A central portion of the grate 50 including the perforations 52 can have a curved or arcuate configuration that is substantially similar or the same in radius to that of the plunger front side 38 of the plunger 24. Consequently, the plunger front side 38 of the plunger 24 may be concentric or parallel with the grate 50 when adjacent to each other in an operational position.

The receiver unit 60 can include an ergonomically configured receiver lever or receiver handle 62 extending from a receiver 72. The receiver handle 62 can include a pair of sidewalls 64 extending from a receiver handle wall 66, all terminating at a receiver handle free end section 68. The sidewalls 64 can perpendicularly extend away from opposite sides of the receiver handle wall 66, respectively, to provide a receiver handle 62 having an open channeled or generally U-shaped configuration defining an open internal cavity defined between the spaced apart sidewalls 64. It can be appreciated that the sidewalls 64 may extend at angles other than perpendicular, or may be curved or rounded to provide an open channeled oval-like configuration. The sidewalls 64 can include a height greatest near the receiver 72 and narrowest near the free end section 68, accordingly, providing a tapering sidewall configuration, as best illustrated in FIGS. 1, 2, 5 and 6.

A distance between the sidewalls 64 can be narrowest near the receiver 72 and greatest near the free end section 68, accordingly, providing a tapering configuration that converges toward the receiver 72, as best illustrated in FIGS. 3, 4 and 8. It can be appreciated that the distance between the sidewalls 64 can be constant along a majority of a length of the receiver handle 62, or can varying along the length of the receiver handle 62 providing an undulating or sinusoidal-like configuration. Further, it can be appreciated that a width of the receiver handle 62 can be configured so as to be received in the internal cavity of the plunger handle 14 when the plunger handle 14 and the receiver handle 62 are brought together during a pressing or mating operation of the food press 10.

In the exemplary, the receiver handle wall 66 can be substantially flat, planar, curved 15 or arcuate. Further in the exemplary, the receiver handle 62 can have a generally curved longitudinal profile. It can be appreciated that the receiver handle wall 66 can have varying degrees of curvature along its longitudinal length. For example, an area of the receiver handle wall 66 near the free end section 68 can have a larger curvature area than that of an area near the received 72.

In some embodiments, an area of the receiver handle wall 66 near the receiver 72 can include a curved bend 65 that extends into each of the sidewalls 64, respectively, as best illustrated in FIGS. 5 and 6.

The sidewalls 64 and/or the receiver handle wall 66 can include ridges, grooves, texturing, padding, attachments and the like to improve manipulation and/or gripping of the receiver handle 62 by a user's hand, foot, footwear or weighted object placed thereon.

The free end section 68 or an area of the receiver handle wall 66 near the free end section 68 can include a flat or planar portion 70. This planar portion 70 can be located on a same side as the receiver handle wall 66, and can include an opening or bore 71 defined therethrough. The bore 71 can be in communication with the internal cavity defined between the sidewalls 64, and can be configured to receive a hook or lanyard or the like to hang the double-hinged food press device and/or system 10.

Taking into account a longitudinal profile of the receiver handle 62, a free edge of the sidewalls 64 can define a curvature at an area near the receiver 72 or along a majority of its longitudinal length that is opposite to a curvature at an area near the free end section 68, as best illustrated in FIGS. 5 and 6.

The section of the sidewalls 64 near the receiver 72 can further curve away from each other as they transition with the receiver 72, as best illustrated in FIGS. 1-4, thereby creating a widening section of the sidewalls 64 and the receiver handle wall 66 near the receiver 72.

The receiver 72 can include a first receiver guide 74 and a second receiver guide 82 spaced apart from each other in part to form a receiver cup 90 with an open-sided configuration and defining a cavity capable of receiving the plunger 24 during a pressing operation.

The receiver cup 90 can include an entrance opening defined between upper edges of the first and second receiver guides 74, 82 that transition to an upper edge of the sidewalls 64, respectively. The receiver cup 90 can further include an exit opening defined between a rim 96 and a lower portion 92 of the receiver cup 90, as best illustrated in FIGS. 1, 5 and 6. The lower portion 92 can be tapering, pointed, curved or arcuate to provide a lower section of the receiver cup 90 that continues with a general shape of the receiver cup 90 and to not obstruct a sweeping action of the plunger front side 38 and/or the seal lip 40. It can be appreciated that the interior surface of the receiver 72 that defines the receiver cup 90 and the lower portion 92 creates a receiver cup cavity that has the same or similar general profile as the perimeter edge of the plunger front side 38 and/or the seal lip 40. Consequently, this allows the plunger 24 to be received therein and travel or sweep therealong during a pivoting operation of the plunger unit 12.

The first receiver guide 74 can include a first roller rest or recess 76 defined in an upper side thereof and/or the rim 96. A first riser 78 extends into the first recess 76 from the rim 96 or an area near the rim 96.

The second receiver guide 82 can include a second roller rest or recess 84 defined in an upper side thereof and/or the rim 96 on a side opposite of the first recess 76. A second riser 86 extends into the second recess 84 from the rim 96 or an area near the rim 96.

In the alternative, the first and second risers 78, 86 can extend up from the upper side of the first and second receiver guides 74, 82, respectively, thereby omitting the first and second recesses 76, 84.

It can be appreciated that the first and second recesses 76, 84 can be concentric to the wall of the receiver cup 90, with outer edges of the first and second recesses 76, 84 that can include their respective risers 78, 86. It can further be appreciated that the first and second recesses 76, 84 can be defined in a thickened area of their corresponding receiver guides 74, 82. This thickened area can extend out from the receiver guides 74, 82 in a conical or tapering configuration, thereby providing the first and second recesses 76, 84 with a thickness greater than the thickness of their corresponding receiver guides 74, 82, as best illustrated in FIGS. 1-4 and 8.

A distance between the first and second recesses 76, 84, or a width of the receiver cup 90 defined by the rim 96, can be greater than the distance between the plunger hinge guides 30, 32 and substantially the same as the distance between the rollers 44, 46. Accordingly, the receiver cup 90 as defined by the first and second recesses 76, 84 can be configured to receive the plunger 24 and the plunger hinge guides 30, 32, while the first and second recesses 76, 84 are configured to receive the first and second rollers 44, 46, respectively. It can be appreciated that at least a portion of the plunger hinge guides 30, 32 are receivable in the cavity of the receiver cup 90 when the rollers 44, 46 are received or resting in their respective recesses 76, 84, as best illustrated in FIG. 25. An interior perimeter edge of the receiver cup that transitions to the receiver cup cavity can be sized, configured or includes a notch or step to not contact an exterior edge of the plunger hinge guides 30, 32, thereby reducing friction on the rollers 44, 46 while still preventing foodstuff from escaping or squeezing thereout.

Extending from each of the first and second receiver guides 74, 82 can be corresponding first and second bored bosses 80, 88, respectively, as best illustrated in FIG. 2. The bosses 80, 88 can extend from their corresponding receiver guides 74, 82 in a direction away from the receiver handle 62 so that a free end of the bosses 80, 88 is located on a same side with the planar portion 70. The free ends of the bosses 80, 88 can be rounded, and can include a gripping material or texture to prevent sliding when in contact with a surface. In the exemplary, the free ends of the bosses 80, 88 are the farthermost lateral extremities of the farthermost downward protuberances of the receiver 60 describing the plane on which it can be steadied upon a flat surface. As shown in FIG. 25, the distance between the farthermost points b, can be greater than ⅔ the distance between the axes of the two hinge pins c.

It can be appreciated that when the receiver unit 60 is placed on a surface 2, as best illustrated in FIGS. 19-22, the free ends of the bosses 80, 88 and the planar portion 70 contact the surface 2 so that the curved configuration of the receiver handle 62 provides an open space between the receiver handle wall 66 and the surface 2. This open space can be sufficient to allow a hand or any part of the hand of a user to pass therethrough, thereby allowing at least the receiver unit 60 to be grasped and/or manipulated when resting on the surface 2.

The bosses 80, 88 can extend past the lower portion 92 of the receiver cup 90 in a spaced apart relationship configured to receive therebetween at least a portion of the second end section 56 of the grate 50. Consequently, the second end section 56 of the grate 50 is rotatable with respect to or about the axis of a receiver pin 94.

It can be appreciated that the curved bend 65 can transition to an edge of each of the bosses 80, 88, as best illustrated in FIGS. 5 and 6, and that sides of the lower portion 92 can transition to interior sides of each of the bosses 80, 88, as best illustrated in FIGS. 2 and 4.

The receiver pin 94 can pass through the bores in the bosses 80, 88. The second end section 56 or a narrowed width section of the second end section 56 of the grate 50 can be snapped, secured, coupled, wrapped or otherwise associated with the receiver pin 94. Consequently, the second end section 56 of the grate 50 is rotatable with or about the receiver pin 94. It can be appreciated that the second end section 56 can be removable from the receiver pin 94, allowing for the grate 50 to be interchanged with other grates. Still further, the receiver pin 94 can be fixed to the hole of the bosses 80, 88, the grate 50 being rotatable around it. Alternatively, the receiver pin 94, can be fixed to the second end section 56 with the receiver pin 94 being rotatable in the hole of the bosses 80, 88.

The receiver pin 94 may take a variety of forms including, but not limited to, the following: a spring pin, a roll pin or flared tubing. It can accept rivets, or can be threaded internally to accept screws. It can have external annular grooves to accept spring clips. The receiver pin 94 can be a pair thereof, inserted from both ends. The pair can comprise a barrel bolt, with male threads on one side mated to female threads on the other side. The receiver pin 94 can be swaged, splined, knurled, threaded outside or otherwise deformed so as to bond more effectively with the bosses 80, 88. Further, the receiver pin 94 can be shorter than the plunger pin 48.

In some embodiments of the present technology, any part of the plunger unit 12 and/or the receiver unit 60 can be, but are not limited to, aluminum die castings with ceramic coatings. The plunger seal can be, but is not limited to, plastic. The plunger and receiver can be plastic, or a plastic plunger can be mated to a metal receiver or vice-versa. Plastic parts may be reinforced with metal armatures or strands of fiberglass or other materials. The fasteners and grate can be, but are not limited to, stainless steel.

In some embodiments, interchangeable grates may be supplied to suit different operations. The holes or perforations of the grate may be larger or smaller, square or star-shaped, smooth or burred. It can further be appreciated that the holes of the grate may be different sizes, shapes, configuration, orientations, patterns, textures and the like.

In some embodiments, the present technology can feature an upswept plunger lever that comfortably and securely accommodates the user's hand.

Referring to FIGS. 19-22, in an exemplary use, it can now be understood that the receiver unit 60 can be placed on a surface 2 such as, but not limited to, a cutting board, a countertop or table, so that the free ends of the bosses 80, 88 and the planar portion 70 are resting on or supported by the surface 2. It can be appreciated that the bosses 80, 88, the curvature and/or length of the receiver handle 62, and/or the orientation of the planar portion 70 can be configured to angularly position the exit opening of the receiver cup 90 with respect to the surface 2.

In this initial position, the receiver cup 90 and the internal cavity of the receiver handle 62 are facing upwards away from the surface 2. This initial position can be conducted while the food press 10 is in an open configuration with the plunger unit 12 not coupled with the receiver unit 60, as best illustrated in FIG. 19.

Figure 23:
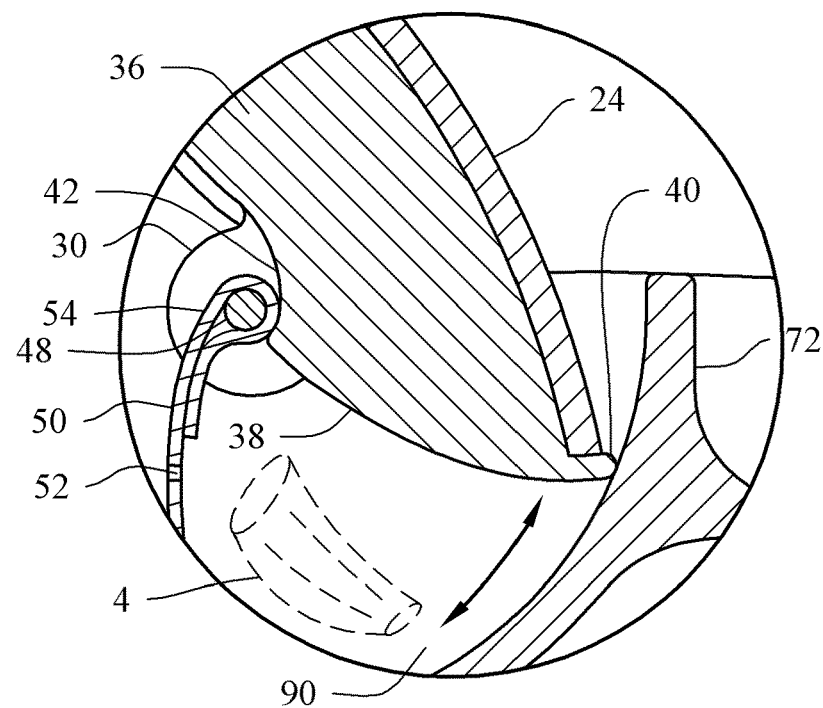
FIG. 23 is an enlarged cross-sectional view taken from a portion of FIG. 21 of the plunger seal contacting the surface of the receiver cup defining the cavity during operation.

Next, the plunger unit 12 can be moved into a mating configuration with the receiver unit 60. This can be accomplished by pivoting or rotating the plunger unit 12 and the grate 50 about the receiver pin 94 in an upwards direction away from the surface 2, as best illustrated in FIG. 20. This pivoting motion can continue until the first and second rollers 44, 46 are forced over and surmount the first and second risers 78, 86, respectively, and then received in their respective recesses 76, 84, as best illustrated in FIG. 23. This can be accomplished with a snap-like operation, assisted by the rotatable nature of the rollers, with the grate 50 flattening against its curved configuration, thereby increasing the distance between the plunger pin 48 and the receiver pin 94 and allowing the rollers 44, 46 to move over their respective risers 78, 86. The inherent biased or spring-like nature of the curved grate 50 would then return to its initial configuration, thereby bringing the rollers 44, 46 into their respective recesses 76, 84. Accordingly, the biased nature of the grate 50 would assist in retaining the rollers 44, 46 in their respective recesses 76, 84 during operation until sufficient force is applied to the plunger handle 14 to remove the rollers 44, 46 from their respective recesses 76, 84 and over the risers 78, 86.

With the rollers 44, 46 mated and retained in their respective recesses 76, 84, the grate is now adjacent or abutted against the rim 96 including the lower portion 92 and adjacent the exit opening of the receiver cup 90, so as to define a chamber or cavity into which foodstuff 4 can be received. Further, the first end section 54 of the grate 50 is pivotably received in the central channel 42 of the plunger seal insert 36.

The receiver handle 62 can be held in one hand with the fingers of the user passing through the open spaced between the receiver handle wall 66 and the surface 2. The other hand of the user can grasp the plunger handle 14 and pivot or rotate the plunger unit 12 about the plunger pin 48 so that the plunger handle 14 is brought towards the receiver handle 62, as best illustrated in FIG. 21. During this operation, the plunger front side 38 of the plunger 24 is swept into the entrance opening of the receiver cup 90. Consequently, the foodstuff 4 is fully enclosed within the cavity or chamber defined by the grate 50, the receiver cup 90 and the lower portion 92. Continued pivoting or rotating of the plunger handle 14 moves the plunger front side 38 of the plunger 24 towards the foodstuff 4, thereby pushing the foodstuff 4 against the grate 50.

Further continued pivoting or rotating of the plunger handle 14 compresses the foodstuff against the grate 50 and forces it out through the perforations 52 of the grate 50, as best illustrated in FIG. 22. When placed on the surface 2, the grate 50 can be at an angle α from the surface 2 so that the foodstuff 4 extruding from the perforations 52 is sufficiently above the surface 2 and away from the grate 50. The angle α can be between 10-90 degrees, and in some cases can be 77.48 degrees.

Alternatively, with the plunger handle 14 in a close relationship with the receiver handle 62, the operation of the plunger handle 14 can be accomplished with one hand by grasping and squeezing together the plunger handle 14 and the receiver handle 62. Yet still in the alternative, with the plunger handle 14 in a close relationship with the receiver handle 62, the user could lean or step on the plunger handle 14 and apply at least a portion of the user's weight on the plunger handle 14, thereby increasing the squeezing force. The now upward curve configuration of the plunger handle free end section 22 may assist in preventing the user's hand or foot from slipping off of the plunger handle 14 during this operation.

Figure 24:
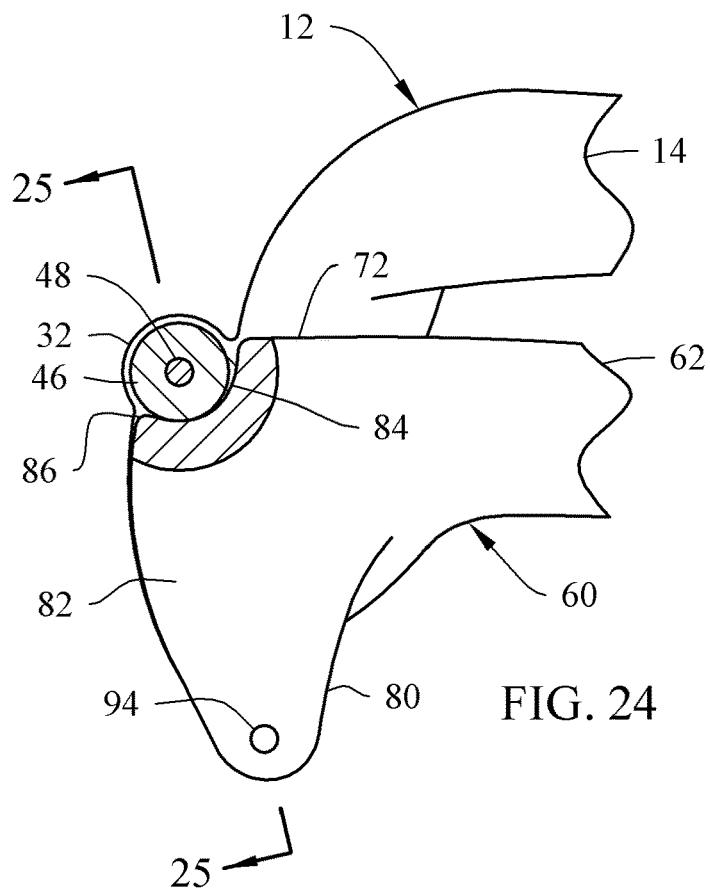
FIG. 24 is an enlarged cross-sectional view of one of the rollers resting in its respective recess and retained by its respective riser.

During this pressing operation, the seal lip 40 of the plunger seal insert 36 travels along and contacts the inner surface of the receiver cup 90 and lower portion 92, as best illustrated in FIG. 24. A front side of the seal lip 40 that continues as plunger front side 38 may act like a squeegee, scraping and cleaning foodstuff or residue off the inner surface of the receiver cup 90 during its travel.

At the same time, the curved surface by which the plunger seal insert 36 is attached into position within the plunger 24 circulates around the second end section 56 of the grate 50, creating a tight seal between the two to prevent foodstuff from exiting between the plunger 24 and the grate 50.

The resulting extrusions of the foodstuff 4 from the perforations 52 may be cleaned from an exterior of the grate 50 by scraping it against an object, such as, but not limited to a knife blade or a rim of a pot or jar.

After the pressing operation is complete, the plunger handle 14 can be pivoted or rotated away from the receiver handle 62 about the plunger pin 48. This results in the plunger 24 being pivoted or rotated about the plunger pin 48 and withdrawing the plunger 24 out of the receiver cup 90. Further pivoting, rotating and/or pulling of the plunger handle 14 may move the rollers 44, 46 out of their respective recesses 76, 84, against the biased nature of the grate 50, and over their respective risers 78, 86. Continued pivoting or rotating of the plunger handle 14, now about the receiver pin 94, will return the food press 10 to its initial open position.

After which, the plunger unit 12 and the grate 50, now unsnapped or unmated from the receiver unit 60, exposes the inner walls of the receiver cup 90 and the grate 50 for cleaning by finger or edged instrument, brush, cloth, and/or stream of water.

In an alternative, the food press 10 can be operated not on the surface 2, but grasped by the hand or hands of the user. In this operation, the user could grasp the receiver handle 62 in one hand, and pivot or rotate the plunger handle 14 toward the receiver unit 60 with the other hand. The mating of the rollers 44, 46 in their respective recesses 76, 84 is similar in operation as previously described. The squeezing of the plunger handle 14 and the receiver handle 62 together during the pressing operation can be accomplished with one or more hands.

It can be appreciated that the grate 50 can be removed from the plunger pin 48 and the receiver pin 94 for further cleaning or for replacement with another grate. It can be further appreciated that the plunger seal insert 36 can be removed from the plunger 24 for cleaning and/or replacement.

Figure 26:
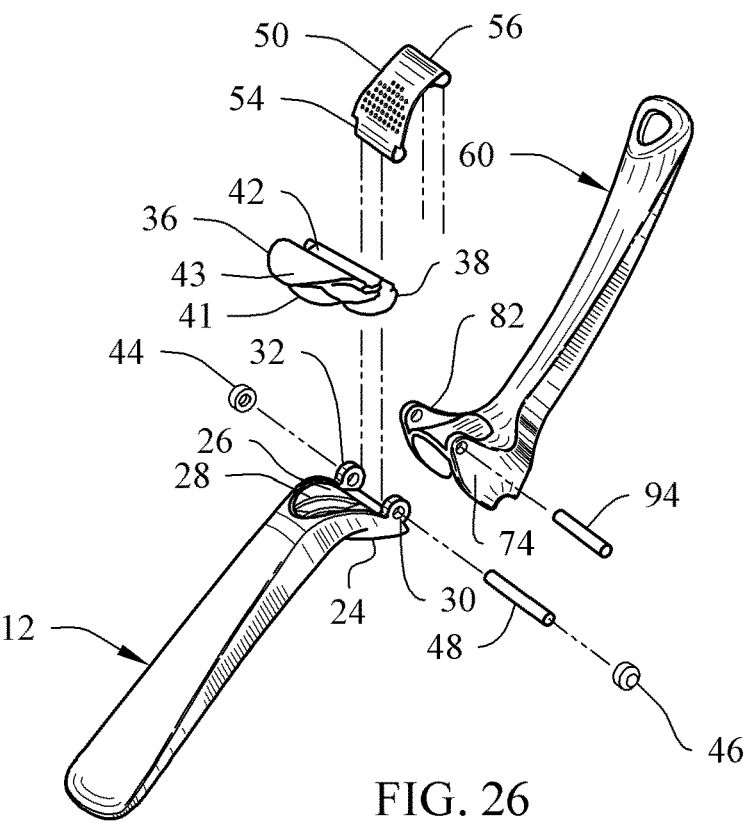
FIG. 26 is an exploded perspective view of the double-hinged food press system of the present technology.

FIG. 26 illustrates the food press system 10 in a disassembled or exploded configuration. The food press system 10 can be provided either fully assembled or disassembled, allowing for interchangeability or replacement of parts and/or for cleaning. In the exemplary and in no particular order, the food press system 10 can be assembled by connecting the plunger seal insert 36 with the plunger 24 so that the plunger ribs 28 and the plunger seal ribs 41 cooperate. After which, the first end section 54 of the grate 50 can be inserted in the opening defined between the plunger hinge guides 30, 32 so that the opening or hole associated with the first end section 54 generally aligns with the holes of the plunger hinge guides 30, 32 and the first end section 54 is received in the central channel 42 of the plunger seal insert 36. The plunger pin 48 can then be inserted through the plunger hinge guides 30, 32 and the first end section 54. The rollers 44, 46 can then be fitted to the free ends of the plunger pin 48, respectively. It can be appreciated that any of the pins 48, 48', rollers 44, 46, 44', 46' and/or shoulder bolt pins 100 as best illustrated in FIGS. 11-15 or similar mechanical fastening means can be utilized in the present technology.

The second end section 56 of the grate 50 can be inserted in the opening defined between the receiver guides 74, 82 so that the opening or hole associated with the second end section 56 generally aligns with the holes of the receiver guides 74, 82. The receiver pin 94 can then be inserted through the receiver guides 74, 82 and the second end section 56.

Figure 27:
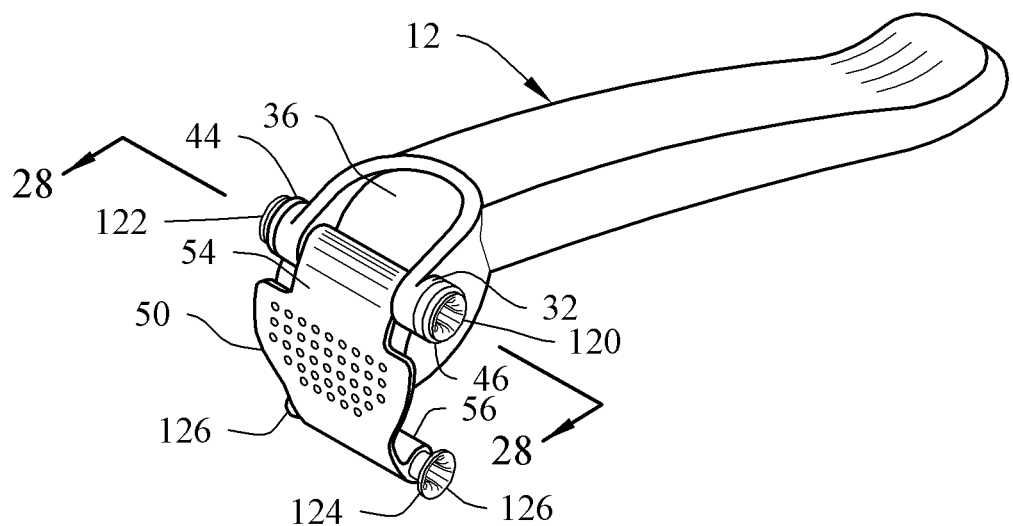
FIG. 27 is a partial perspective view of the grate and the plunger unit including the insert, grate, rollers and flared tubes.
Figure 28:
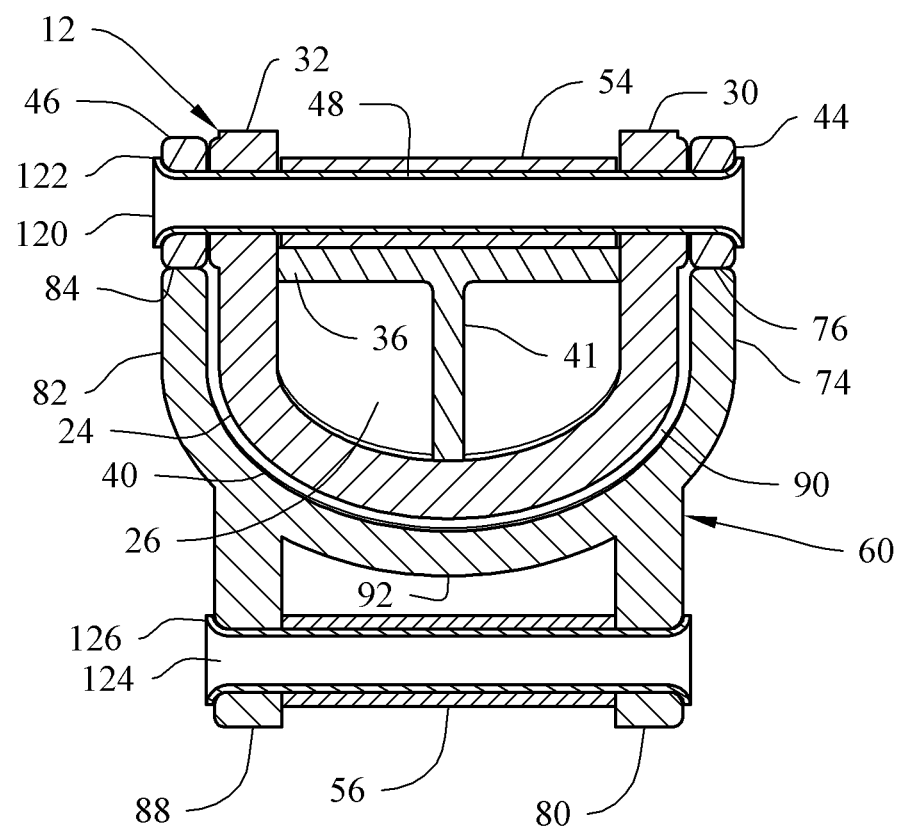
FIG. 28 is an enlarged cross-sectional view of the flared tubes, the plunger, the plunger seal, the receiver guides, the rollers resting in their respective recesses and the hinge guides received in the cavity of the receiver cup taken along line 28-28 in FIG. 27.

Referring to FIGS. 27 and 28, the present technology can include a plunger tube 120 and a receiver tube 124 that can be utilized in place of the plunger pin and the receiver pin, respectively. The plunger tube 120 can be a hollow tube configured to pass through a recess, notch, opening or bore defined in or through each of the plunger hinge guides 30, 32. Further, the first end section 54 of the grate 50 can be snapped, secured, coupled, wrapped or otherwise rotatably associated with the plunger tube 120. Consequently, the first end section 54 of the grate 50 can be rotatable with or about the plunger tube 120. Plunger tube 120 can be fixedly attached to rollers 44 and 46, or the rollers can be held in place by rivets or screws. Otherwise, plunger tube 120 can be pressed fixedly into either, but not both, grate end section 54 or plunger guides 30 and 32. It can be appreciated that plunger tube 120 can be withdrawn from the first end section 54 and plunger tube 124 can be removable from second end section 56, allowing for the grate 50 to be interchanged with other grates.

The plunger tube 120 can include flared ends 122 having a diameter greater than the plunger tube 120. The flared ends 122 can be formed after the plunger tube 120 is received through the plunger hinge guides 30, 32, the first end section 54 of the grate 50, and the rollers 44, 46. The flared ends of 122 can create a compression force therebetween to rotatably secure the assembled rollers 44, 46, the plunger hinge guides 30, 32 and the first end section 54 of the grate 50, as best illustrated in FIG. 28. Flared tube 120 could be considered disposable, the flared ends easily drilled off for reconfiguration of the assembly without damage to other parts. Alternatively, plunger tube 120, having flared ends, can comprise half-tubes that can be pressed in from both sides. In that case, flared tubes could be removed undamaged, to enable interchange of grates.

The plunger unit 12 and the grate 50 can be pivoted or rotated about the plunger tube 120 and/or the receiver tube 124 during operation of the present technology. This pivoting motion can continue until the rollers 44, 46 are forced over and surmount the first and second risers, respectively, and then received in their respective recesses 76, 84.

It can be appreciated that the plunger tube 120 can be sized or adapted to include an increased diameter section adjacent the flared ends 122 to act as roller sections, thereby omitting the rollers 44, 46.

The receiver tube 124 can be utilized to replace the receiver pin. The receiver tube 124 can be a hollow tube configured to pass through a recess, notch, opening or bore defined in or through each of the bosses 80, 88 of the receiver unit 60. The second end section 56 of the grate 50 can be snapped, secured, coupled, wrapped or otherwise rotatably associated with the receiver tube 124. Receiver tube 124 can be pressed fixedly into either, but not both, grate end section 56 or receiver bosses 80 and 88. Consequently, the second end section 56 of the grate 50 can be rotatable with or about the receiver tube 124. It can be appreciated that the second end section 56 can be removable from the receiver tube 124, allowing for the grate 50 to be interchanged with other grates. Still further, the second end section 56 can be fixed to the receiver tube 124, with the receiver tube 124 being rotatable in the hole of the bosses 80, 88 of the receiver unit 60.

The receiver tube 124 can include flared ends 126 having a diameter greater than the receiver tube 124. The flared ends 126 can be formed after the receiver tube 124 is received through the bosses 80, 88 of the receiver unit 60 and/or the the second end section 56 of the grate 50. The flared ends 126 can be formed to secure the receiver tube 124 in place. Flared tube 124 could be considered disposable, the flared ends easily drilled off for reconfiguration of the assembly without damage to other parts. Alternatively, receiver tube 124, having flared ends, can comprise half-tubes that can be pressed in from both sides. In that case, flared tubes could be removed undamaged, to enable interchange of grates.

Figure 29:
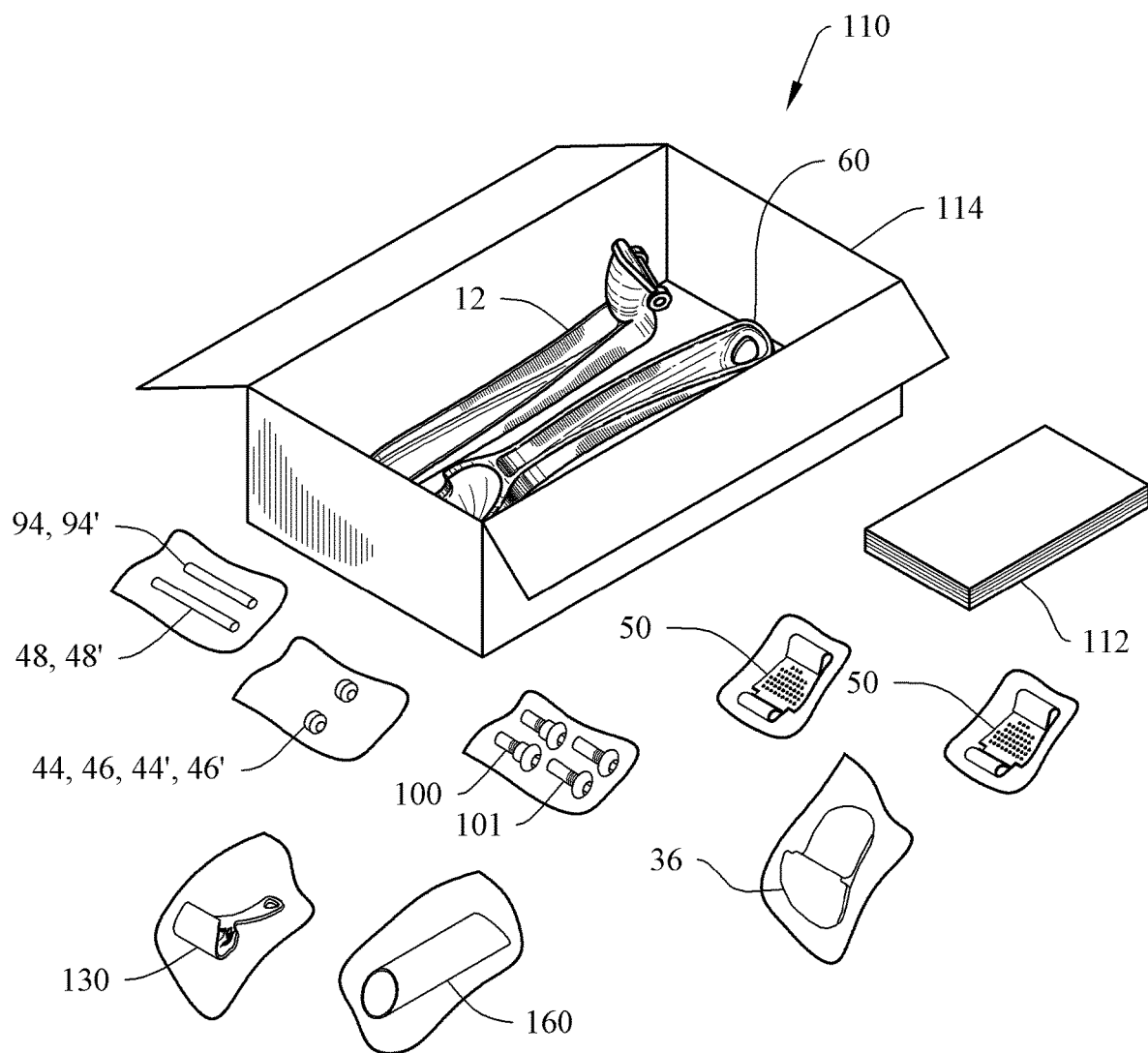
FIG. 29 is a perspective view of a kit of the present application including components associated therewith.
Figure 30:
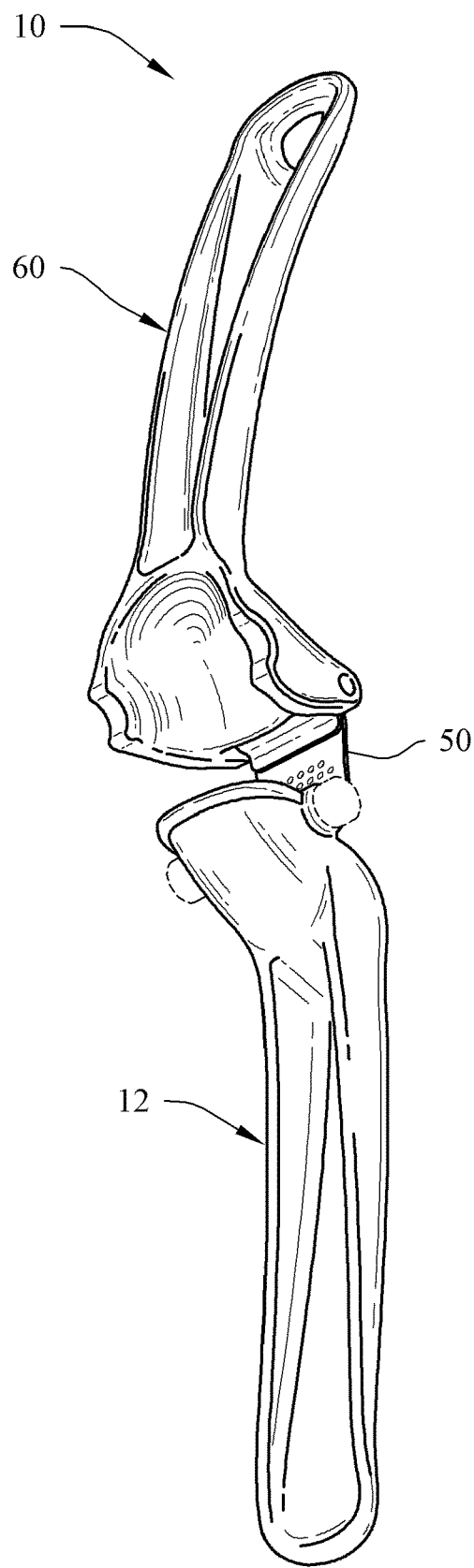
FIG. 30 is a front-right perspective view of a design aspect of the food press of the present technology, with the dashed (dash-dash) lines forming no part of the design.
Figure 31:
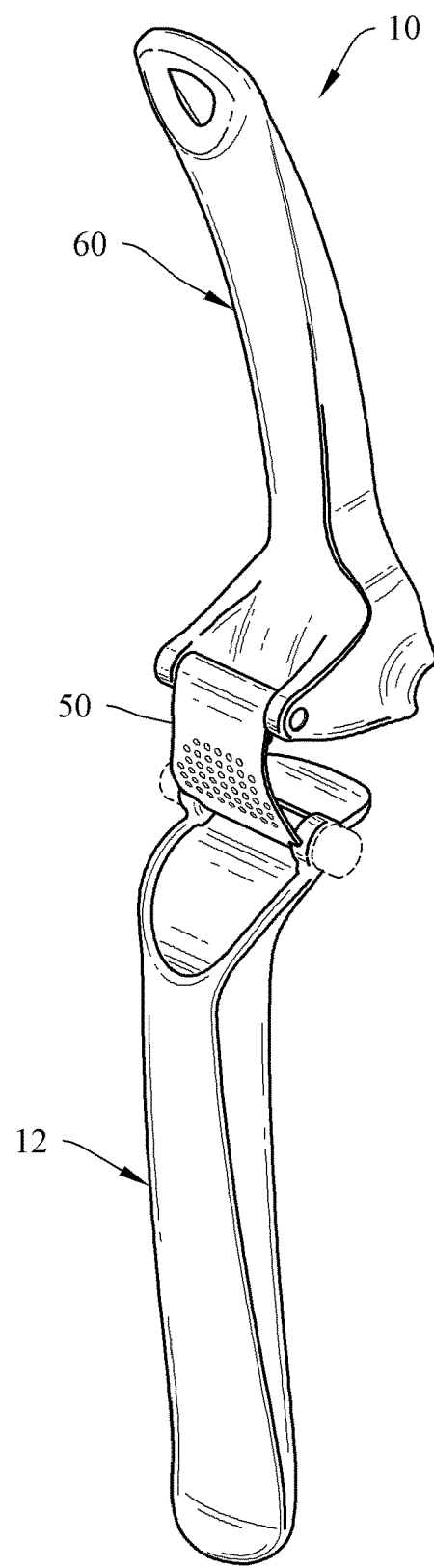
FIG. 31 is a rear-left perspective view of the food press design of FIG. 30.
Figure 32:
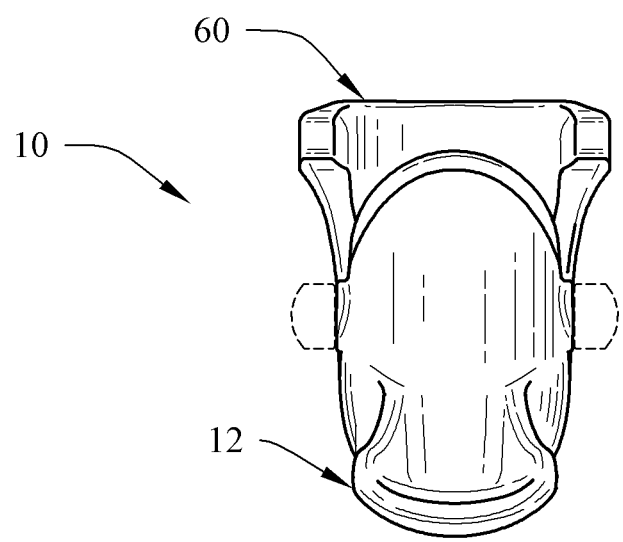
FIG. 32 is a bottom plane view of the food press design of FIG. 30.
Figure 33:
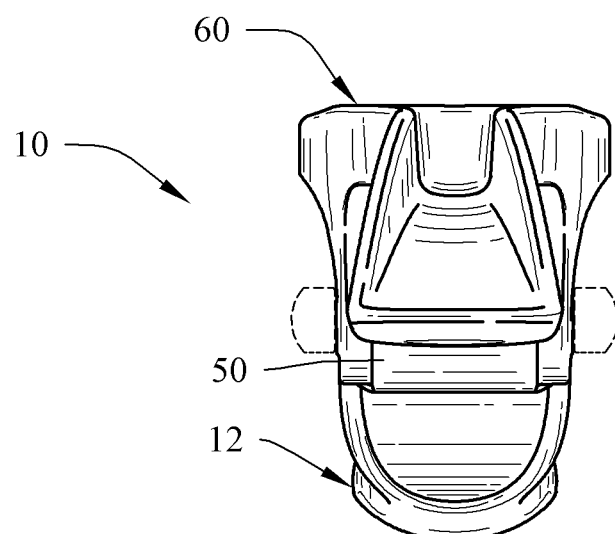
FIG. 33 is a top plane view of the food press design of FIG. 30.
Figure 34:
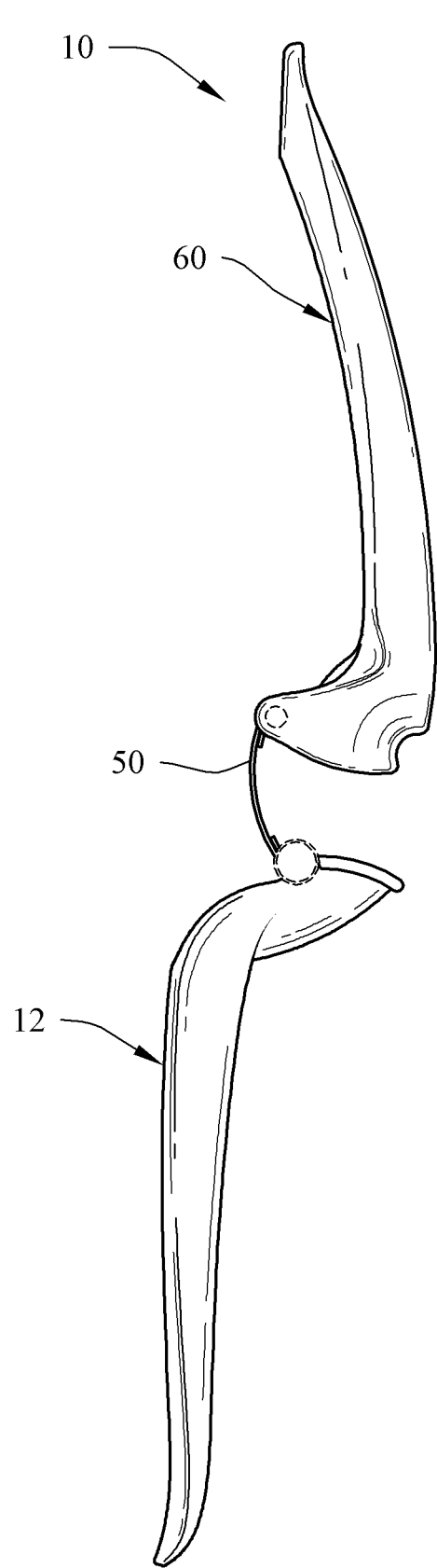
FIG. 34 is a right-side view of the food press design of FIG. 30.
Figure 35:
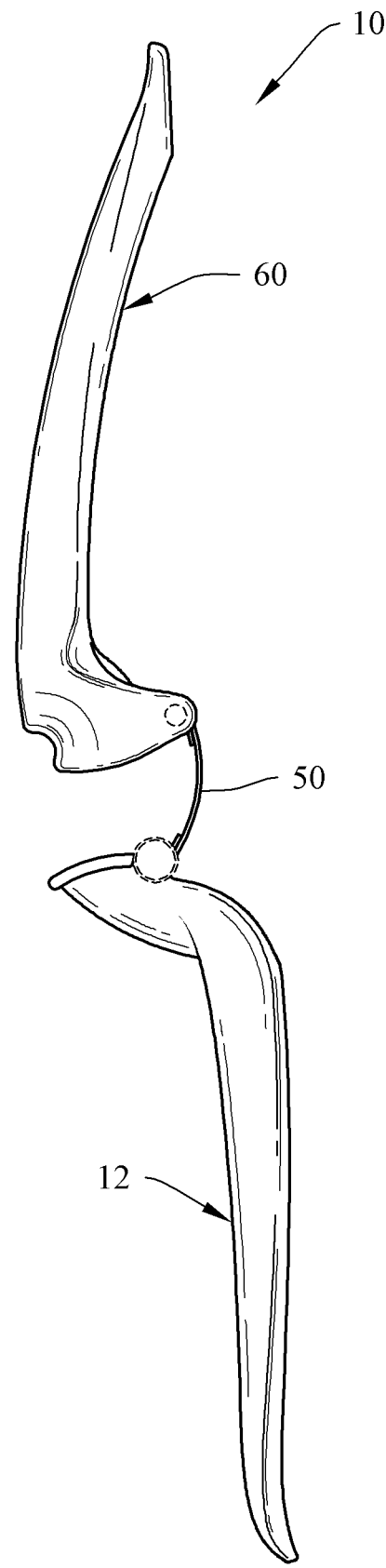
FIG. 35 is a left-side view of the food press design of FIG. 30.
Figure 36:
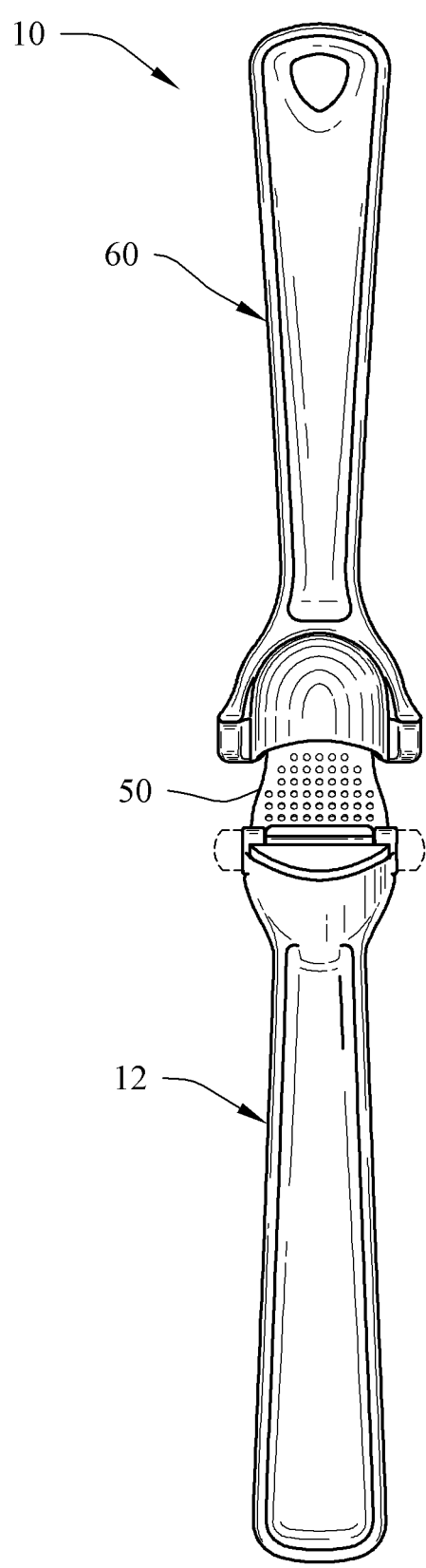
FIG. 36 is a front-end view of the food press design of FIG. 30.
Figure 37:
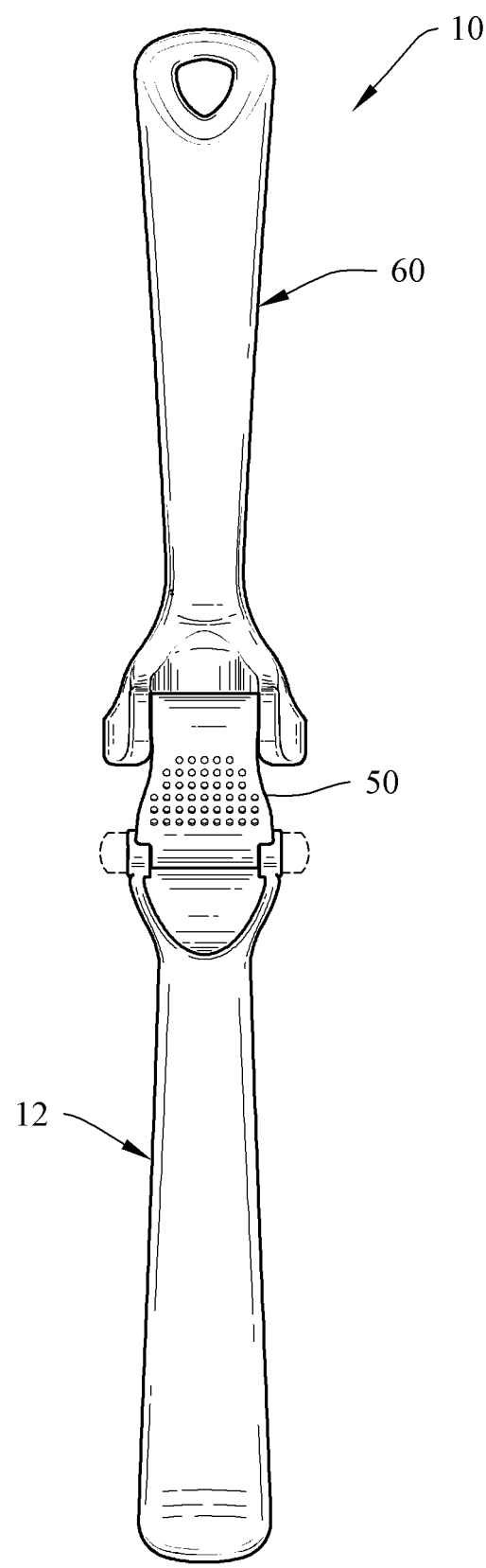
FIG. 37 is a rear-end view of the food press design of FIG. 30.
Figure 38:
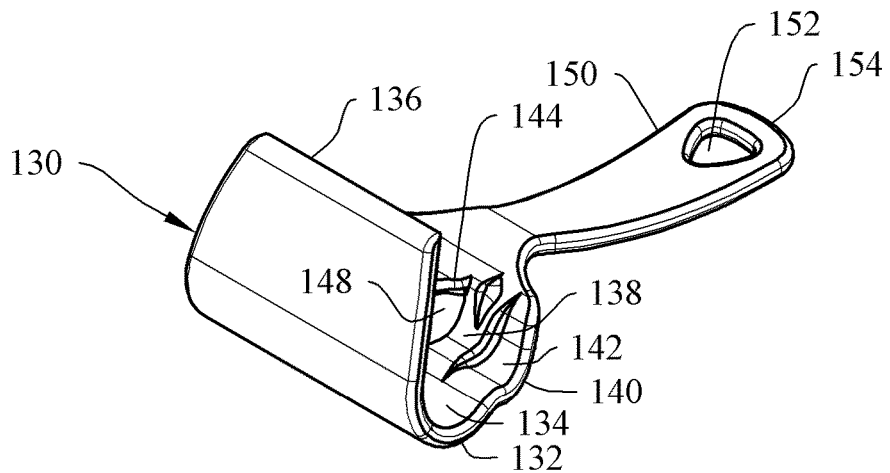
FIG. 38 is a top-right perspective view of the paddle utilizable with the double-hinged food press system.
Figure 39:
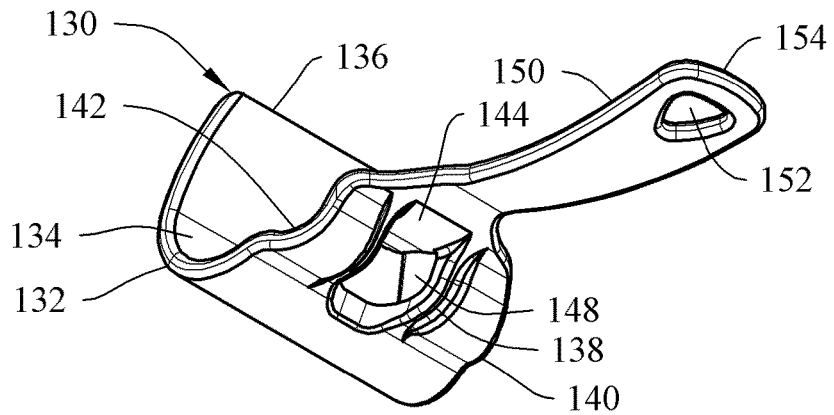
FIG. 39 is a bottom-left perspective view of the paddle.
Figure 40:
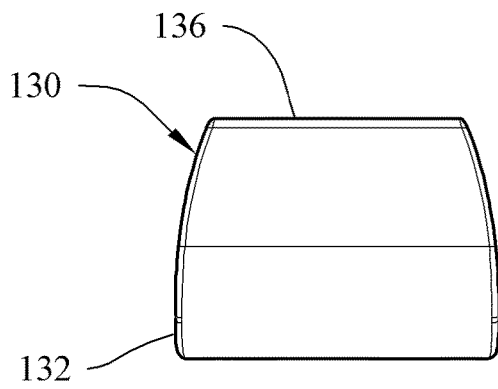
FIG. 40 is a front-end view of the paddle.
Figure 41:
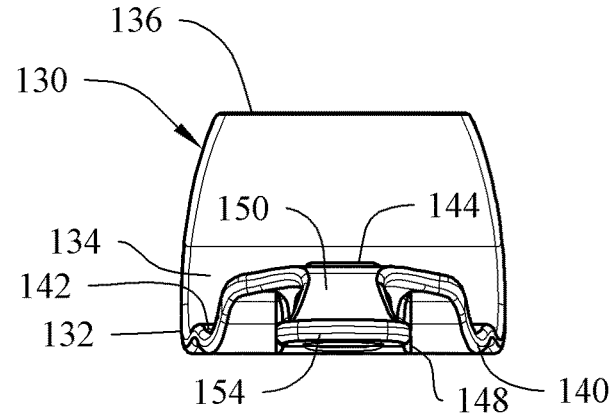
FIG. 41 is a back-end view of the paddle.
Figure 42:
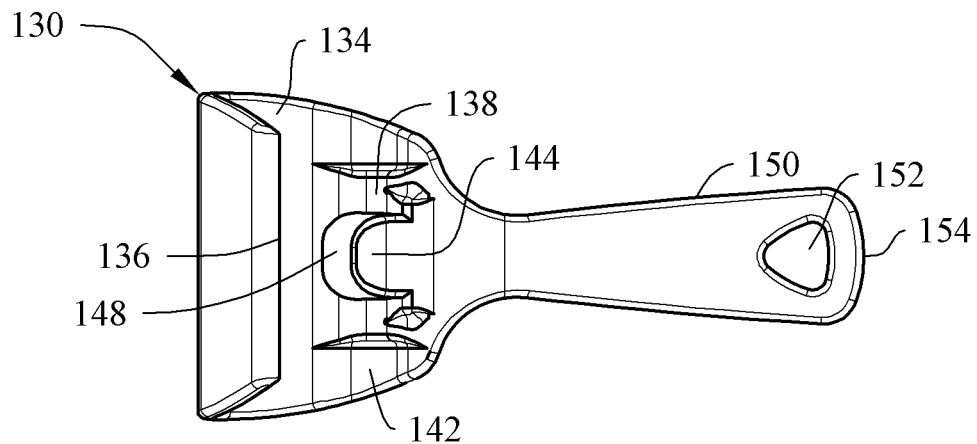
FIG. 42 is a top plane view of the paddle.
Figure 43:
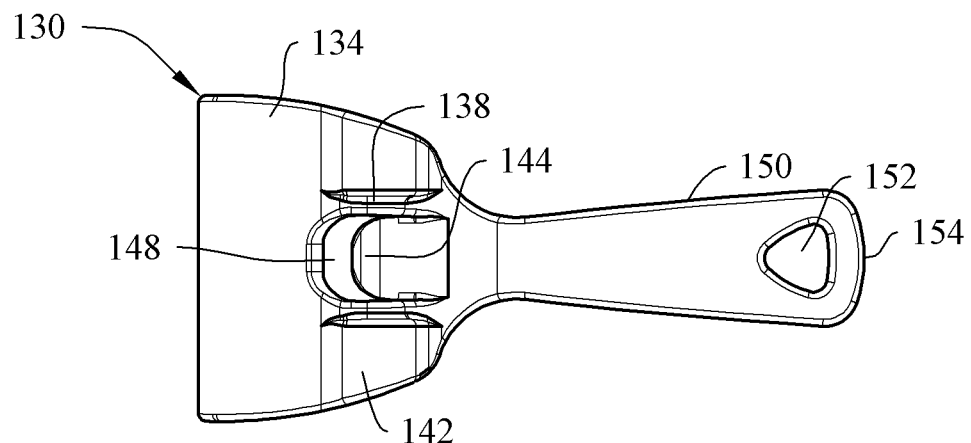
FIG. 43 is a bottom plane view of the paddle.
Figure 44:
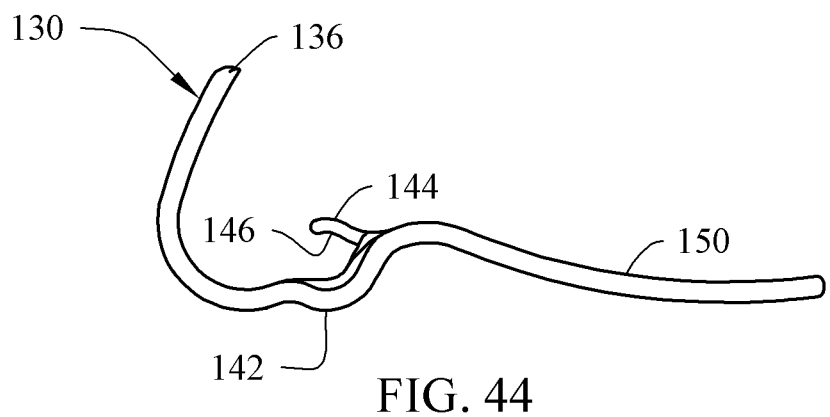
FIG. 44 is a right-side view of the paddle.
Figure 45:
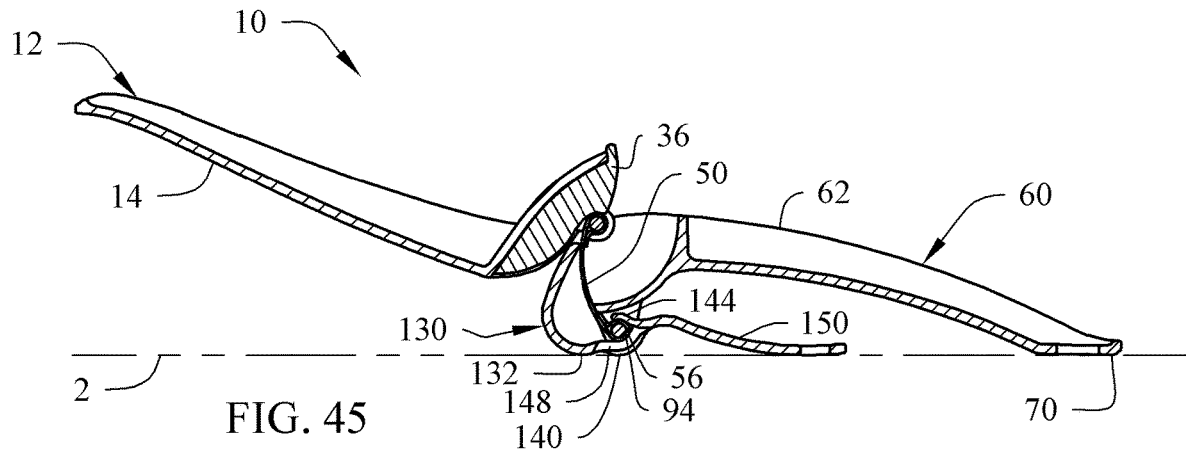
FIG. 45 is a cross-sectional view of the double-hinged food press system in an open configuration with the paddle attached while supported on a support surface.
Figure 46:
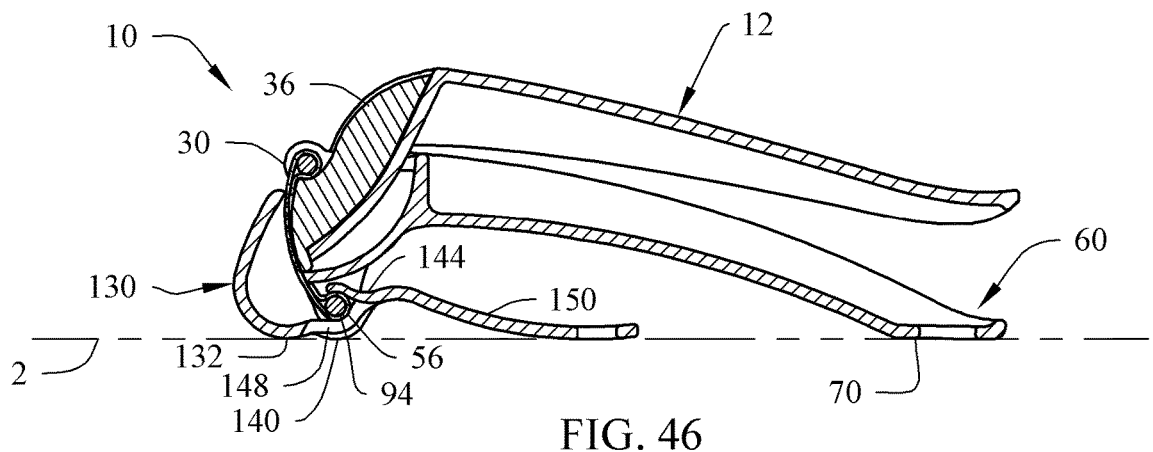
FIG. 46 is a cross-sectional view of the double-hinged food press system and assembled paddle of FIG. 45 while supported on the support surface with the plunger handle being pivoted or rotated about the plunger pin in operation to confine or press foodstuff.
Figure 47:
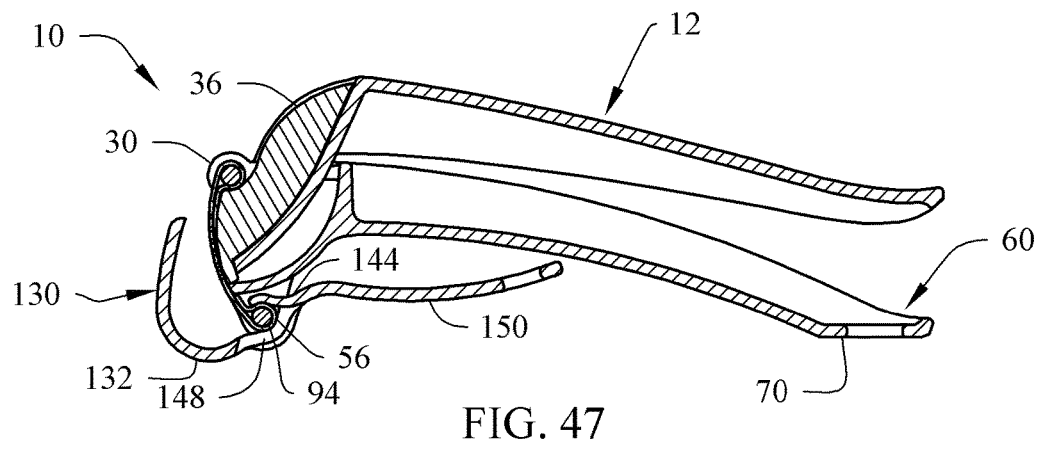
FIG. 47 is a cross-sectional view of the double-hinged food press system and assembled paddle of FIG. 45 with paddle pivoted about receiver pin towards the receiver handle to open the trough of the paddle from the grate.

Referring to FIG. 29, it can be appreciated that the present technology may be sold or provided as kit 110, including any of the components described herewith. In the exemplary, the kit 110 can include the following parts: one or more plunger units 12 stored individually or in packaging; one or more plunger seal inserts 36 stored individually or in packaging; one or more plunger and receiver pins 48, 48', 94, 94' and/or shoulder bolt pins 100 and screw pins 101 stored individually or in packaging; two or more rollers 44, 46, 44', 46' stored individually or in packaging; multiple grates 50 stored individually or in packaging; one or more receiver units 60 stored individually or in packaging; a pulp collection paddle 130; a tubular peeler 160; an Allen or other type of wrench, screwdriver, or other tool for inserting and/or removing the pins or other fasteners; at least one user instruction manual 112, and a box, carton or packaging 114 configured to contain all the components of the kit 110. The rollers 44, 46, 44', 46' may be multiple rollers of the same size and type, or of different sizes and/or types. The grates 50 may be multiple grates of the same size, shape or hole configuration, or multiple grates each having a different size, hole size, hole pattern and/or hole configuration. The plunger and receiver pins 48, 94, 48', 94' may be multiple pins of the same size and shape, or of different sizes and/or shapes.

The instruction manual 112 can include text and/or illustrations such that functional and/or assembled relationships are detailed in relation to the structure of the food press system of the present technology (such that the invention can be assembled, used, maintained, or the like in a preferred manner).

An exemplary design aspect of the present technology is illustrated in FIGS. 30-37. These figures show an exemplary design of the present technology, with the dashed (dash-dash) lines forming no part of the design. The exemplary design aspect performs any and/or all of the same functions of any and/or all embodiments of the present technology. It can be appreciated by the exemplary design that some edges are curved, with a smooth transition between surfaces.

Referring to FIGS. 38-49, the double-hinged food press device 10 of the present technology can include a pulp collection paddle 130 utilized with the double-hinged food press device 10, thereby providing an alternate food press system.

When the food press system is operated in the air, pulp or foodstuff may be aimed downwards to be received by a pot, bowl or other vessel, but when levered against a support surface, the increased force can spray pulp a great distance, leading to mess and waste. Consequently, a retainer may be required to contain the pulp or extruded foodstuff.

Food preparers who elect to press garlic or other materials against a support surface will appreciate an inexpensive, compact accessory to collect pulp or extruded foodstuff and transfer it to cooking vessels. This can take the form of a paddle 130 being a sheet of material positioned ahead of the grate 50, curved or angled up and back towards it. This would create a trough to collect expressed pulp that can then be shaken or wiped into a vessel. The trough can extend under the press, engaging it to maintain alignment.

Ideally, this paddle 130 can serve in other capacities. In one embodiment, it can serve to scrape pulp or foodstuff from the exterior of the grate 50. In other embodiments, the paddle 130 can serve as a cutting board for slicing open cloves of garlic or other comestibles or as a sticky flexible peel remover or a combination of these.

Referring now to the drawings FIGS. 38-44, one embodiment of the pulp collecting paddle 130 can include a substantially semi-cylindrical wall 132 curving forward, upward and back around a lateral axis of the paddle, thereby forming a trough 134 and ending in a sharp edge 136 parallel to the lateral axis. To the rear of the lateral axis, the trough 134 curves up and back to form a rear wall 138. At the point where the upward curve begins, lateral portions of a wall 140 curve farther down and back to form shallow recesses 142 before curving up to join a central portion of the rear wall 138.

Between the recesses 142, a tab, clip or tongue 144 can rise up from and project ahead of the rear wall 138. An inner surface 146 of the tongue 144 can be partially concentric with the recesses 142. An opening 148 can be defined below and contiguous with the tongue 144.

The paddle 130 can further include a paddle handle 150 extending out from behind the tongue 144. A hole 152 can be defined through the handle 150 and located towards an end 154 of the paddle handle 150.

FIGS. 45-49 show that the paddle 130 in an exemplary operation can be placed against the food press system 10 such that the edge 136 will touch the grate 50 just above the perforations 52. The straight edge 136 can be sharp to aid in severing pulp or foodstuff caught in perforations 52. To the rear of the trough 134, the recesses 142 on either side thereof can cradle the receiver bosses 80, 88 to locate them.

The tongue 144 embraces the second end section 56 of the grate 50, and pinches the second end section 56 against an interior side of the recesses 142. When assembled, an opened area between the inner surface 146 of the tongue 144 and the interior side the recesses 142 can receive the second end section 56 of the grate 50 in a snap-like manner. Friction and/or a biasing nature of the tongue 144 can secure the paddle 130 to the food press while allowing for the paddle 130 to pivot about the second end section 56 and consequently the receiver pin 94.

Figure 48:
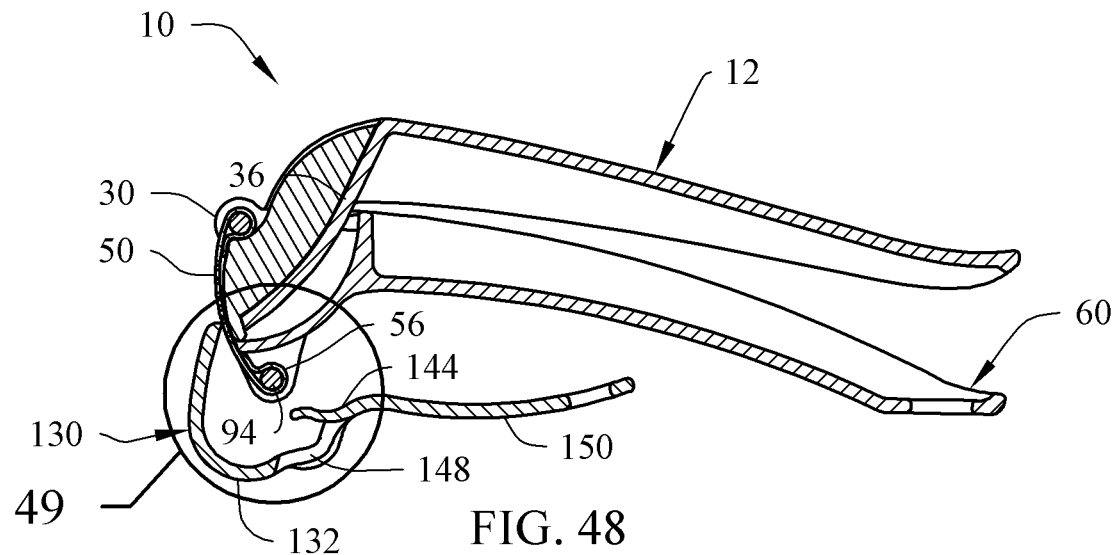
FIG. 48 is a cross-sectional view of the double-hinged food press system and assembled paddle of FIG. 45 with paddle being removed from the receive pin.
Figure 49:
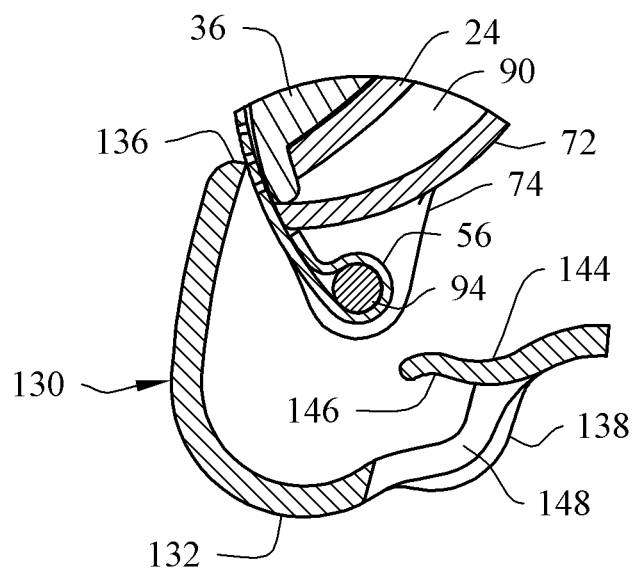
FIG. 49 is an enlarged cross-sectional view of FIG. 48 showing the tongue of the paddle removed off the receiver pin.

The paddle handle 150 enables the user to manipulate the paddle 130, unsnapping it from the food press 10 to transport the pulp or extruded foodstuff. The paddle handle 150 further allows the user to dislodge the opened area between the inner surface 146 of the tongue 144 and the interior side the recesses 142 that receives the second end section 56 by rotating the paddle handle 150 away from the receive unit 60, as best illustrated in FIGS. 48 and 49. The paddle 130 can alternatively be dislodged from the second end section 56 by tapping into a vessel without exposing the fingers to smelly pulp.

The hole 152 in the far end 154 of the paddle handle 150 can accommodate a hook or lanyard for storage. The paddle handle 150 can be formed so that a portion near the end 154 is contiguous with the support surface 2 when placed thereon, to be out of the way of the user's fingers. In addition, the semi-cylindrical wall 132 that forms the trough 134 can rest on the support surface 2, which forces the paddle 130 to rotate the edge 136 against the grate 50, constraining the pulp or extruded foodstuff in the trough 134.

In an exemplary use, it can now be understood that the first and second receiver guides 74, 82 of the receiver cup 90 of the receiver unit 60 can be placed within the trough 134, and pressed back against the shallow recesses 142 until the tongue 144 engages the second end section 56 of the grate 50. The assembled food press 10 and paddle 130 can be set upon the support surface 2, so the weight of the food press 10 can impact the paddle 130 such that the sharp edge 136 is pressed against the front of the grate 50. This can be accomplished by the paddle 130 being capable of rotation about the second end section 56 and the receive pin 94. The food press 10 can be actuated in the same way as described above with reference to FIGS. 19-22.

When the foodstuff contained in the receive cup 90 has been pressed, the assembled food press 10 and paddle 130 can be lifted upwards, with the plunger and receive units 12 and 60 gripped between the user's fingers and palm. Once airborne, the forward portion of the paddle handle 150 can be squeezed against and/or towards the receive unit 60 by the user's finger or thumb, thereby first rotating the paddle edge 136 away from the grate 50, then drawing the paddle 130 back until the second end section 56 of the grate 50 escapes the tongue 144.

The paddle 130 can then be taken in the other hand, and the sharp edge 136 can be drawn down across the perforations 52, severing and collecting residue in the trough 134 to be used, for example, by dispensing into a vessel. In the exemplary, the residue can also be urged out of the trough 134 using the rounded blade of a bread knife, or either the rounded ends 22 or 68 of the food press handles 14 or 62 respectively, or a finger.

The paddle 130 can be injection-molded of polycarbonate, polypropylene, nylon or other semi-rigid plastic. The opening 148 below the tongue 144 enables the paddle 130 to be made in a two-part mold. Alternatively, the paddle 130 can be stamped from stainless sheet, and the opening 148 can be formed by the excision of the tongue 144.

Further, the paddle 130 can be color-coordinated with a color of the plunger seal insert 36. Still further, the paddle 130 can be included in the kit 110, as best illustrated in FIG. 29.

Figure 50:
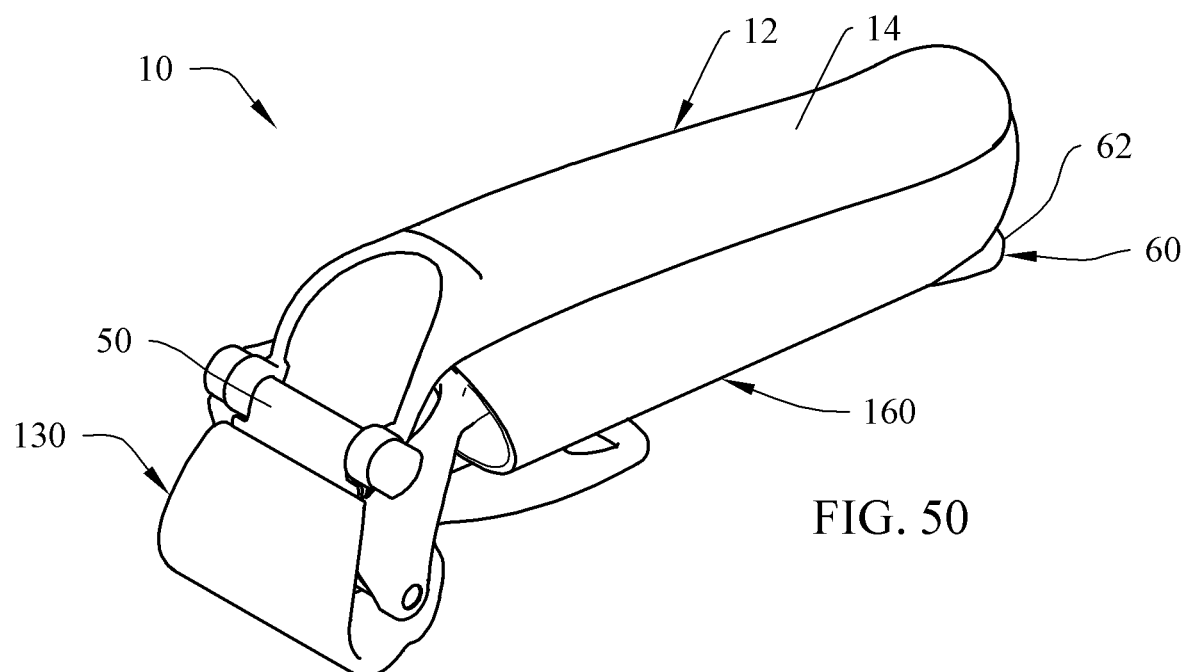
FIG. 50 is a top-right perspective view of the sleeve positioned on the receiver handle the double-hinged food press system in an exemplary assembly.
Figure 51:
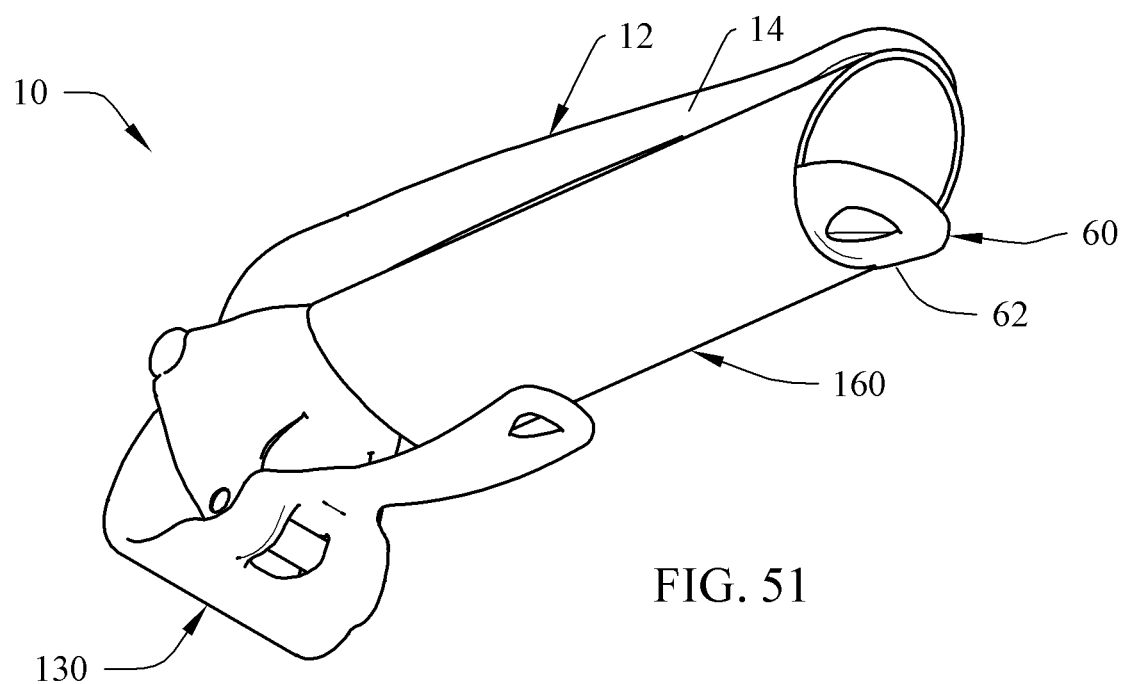
FIG. 51 is a bottom-left perspective view of the sleeve assembled on the receiver handle.
Figure 52:
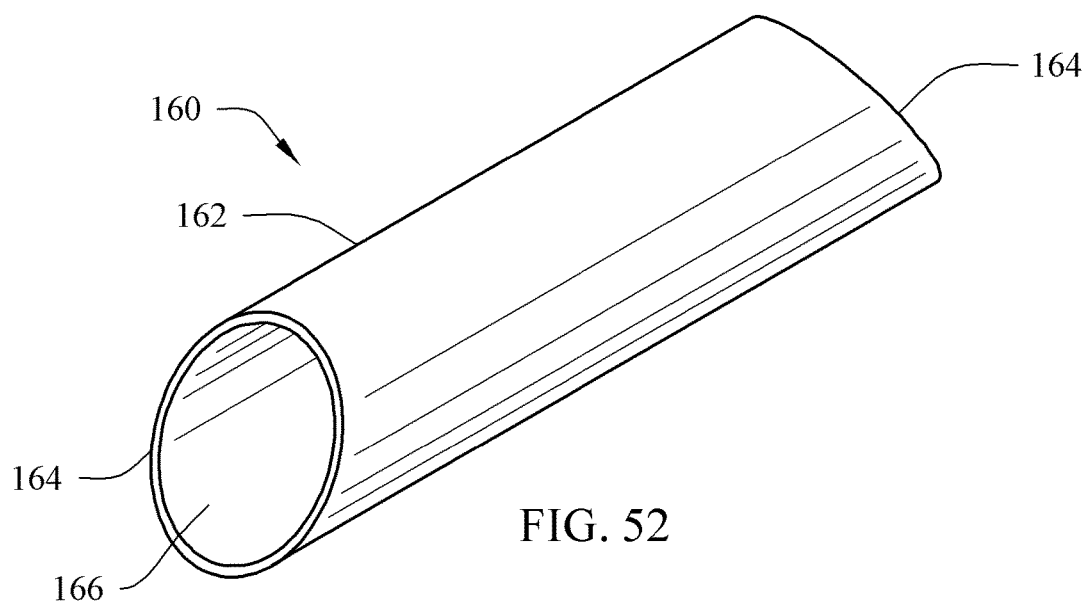
FIG. 52 is a top-right perspective view of the sleeve.

Referring to FIGS. 50-23, the double-hinged food press device 10 of the present technology can include a tubular peeling sleeve 160 receivable on the plunger handle 14 of the plunger unit 12 and/or the receive handle 62 of the receiver unit 60 for packaging or storage.

It can be appreciated that the plunger handle 14 and/or the receiver handle 62 can be wider at its extremities or sides, thereby allowing for gripping of the peeling sleeve 160 when slid thereon.

The peeling sleeve 160 can include a tubular body 162 defining a hollow interior 166, and distal ends 164. The distal ends 164 can be angled or tapering allowing for placement on the plunger and receive handles 14, 62, respectively. The peeling sleeve 160 can be slid off its corresponding handle and freely used to peel the skin off food items.

The sleeve 150 can be included in the kit 110, as best illustrated in FIG. 29. Further, the sleeve 150 can be color-coordinated with the color of the plunger seal insert 36 and the paddle 130.

The food press system of the present technology may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

In some or all embodiments, any part of the plunger unit and/or the receiver unit can be aluminum die castings with ceramic coatings. Any fasteners, pins and/or the grate can be stainless steel.

In some or all embodiments, the rollers can be fixed immovably, pressed onto the rotatable plunger pin. The plunger handle can be upswept in a way that comfortably and securely accommodates the user's hand.

Some or all embodiments of the present technology can include a plunger seal provided along a perimeter edge of the plunger front side where a plunger rear side and the plunger front side meet when no separate plunger seal insert is utilized. The plunger seal can include a groove configured to receive a ridge extending out from a perimeter of the plunger rear side, from the plunger front side or where the plunger rear side and the plunger front side meet. The plunger seal can further include a front planar section, and a free edge. It can be appreciated that the plunger seal can cover the ridge as well as a portion or all of the plunger front side.

The plunger seal can be made of, but not limited to, nylon, acetal, polypropylene, thermoplastic vulcanizates, or any other forgiving nonporous material. The plunger seal can be fixed immovably in place upon the plunger solely by the pressure of the grate around which it rotates. The plunger seal may be replaced by two or more different parts, sealing different areas. In some embodiments, the plunger and plunger seal may be molded as a single part with different material properties, co-molded or otherwise.

The present technology food press adds features to improve the functionality of bearing surfaces and to accommodate countertop use. The plunger hinge guides no longer bear directly on the receiver recesses; they are now replaced by rollers that rotate independently of the plunger. The main body of the plunger no longer bears on the interior wall of the receiver; now a narrow sealing surface, proud of the body of the plunger only at its working compressive face, squeegees the receiver. Another sealing surface at the face of the plunger squeegees the grate as it curves around the pin that bears the rollers. These sealing surfaces are relatively soft and flexible to conform to the surfaces they sweep. The plunger lever is now upswept at the far end to provide a comfortable, secure handle.

It can be appreciated that the known double-hinged presses do not feature a plunger with flexible seals that follow the contours of the receiver and hinge. It can be further appreciated that the known presses do not feature an upswept plunger lever that cradles the user's hand, and when combined with a stable receiver set on a worksurface, prevents it from slipping off the press.

Some advantages of these improvements or changes in the present technology can be that the workpiece is more effectively sealed into the chamber until it is either extruded through the grate or released after completion of the operation. The rollers enable the grate to snap easily and securely into and out of place without suffering undue wear. They may also support the receiver against lateral deformation. The press is designed in such a way that it can be set on a level surface and pressed from above, so as to comfortably accept the user's body weight without tipping or slippage.

It can be appreciated that the present technology press includes an effective sealing action in which the plunger wipes evenly against the inner wall of the receiver. The present technology press can snap apart to expose every surface for easy cleaning without disassembly of loose parts. The present technology press is relatively simple, having few moving parts, and is inexpensive to manufacture. In the exemplary, the major parts can easily be made of recyclable die-cast aluminum and injection-molded plastic assembled in such a way that they provide a tight seal. Further in the exemplary, the grate can be stamped of readily-available 1 mm thick 304 stainless steel sheet. The present technology press can include different finishes, textures, patterns, sizes, shapes and colors, such as but not limited to, electroplating, PVD, anodizing, and other ceramic finishes. Plastic parts of the present technology could be offered in a variety of colors. Reinforced plastics could be substituted for aluminum. Still further in the exemplary, parts could also be cast in titanium, and it can be appreciated that the plunger might unlikely be cast in stainless steel, as it might probably be heavy enough to pull the grate from the receiver, dismantling the receiving enclosure.

With the above in mind, the present technology is a press for crushing foodstuff or workpiece, for example garlic or like material, a press which fully constrains the workpiece, forcing the foodstuff through the holes of the grate. The present technology press can open so as to lie flat in the air or on a work surface as it receives the foodstuff. The press may be operated by drawing the thumb and fingers of one hand towards each other, or by setting it on a work surface and applying the pressure of one or both hands to the upper lever. After pressing, the rollers enable one end of the grate to smoothly disengage from detents at the sides of the receiving basin.

The core components of the present technology can be the plunger unit, the receiver unit, the grate that may serve as part of the receiver unit, the plunger pin, two rollers and the receiver pin. The plunger pin can connect the plunger unit, the first end section of the grate and the two rollers on the same axis. The receiver pin can connect the second end section of the grate to the receiver unit. The rollers can engage with depressions/recesses in a central portion of the receiver.

The present technology press can include a cap that eliminates a pocket in the plunger and a plunger lever having a recess that positions the user's hand when the press is pressed against a solid flat surface. The receiver lever can feature points on a plane that stabilizes the press on the flat surface so that weight can be applied to the plunger handle without the present technology press slipping on the surface, allowing for the utilization of additional force to be applied thereto.

While embodiments of the double-hinged food press device, system and method have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although pressing foodstuff more effectively and for a longer period of service, operating and cleaning the press more easily, have been described, it should be appreciated that the double-hinged food press device, system and method herein described is also suitable for grating or extruding foodstuff and/or extruding non-food material.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A press system comprising:
   a plunger unit including a plunger and a lip extending from at least a portion of a perimeter of a front side of the plunger;
   a receiver unit including a receiver cup defining a cavity configured to receive at least a portion of the plunger;
   a grate including perforations, a first end section rotatably associated with the plunger unit, and a second end section rotatably associated with the receiver unit; and
   a paddle attachable to the receiver unit, the paddle including a trough section positionable adjacent the grate when the paddle is attached to the receiver unit, and the trough section of the paddle being configured to receive material extruded through the grate;
   wherein the plunger unit and the receiver unit are rotatable with each other upon two separate axes, so that the lip contacts and sweeps a surface of the receiver cup that defines the cavity.

2. The press system according to claim 1, wherein the paddle further comprises a tongue that projects upwardly and away from an end of the trough section and toward a lateral edge of the paddle to define an opened area between the tongue and the trough section.

3. The press system according to claim 2, wherein the opened area between the tongue and the trough section is configured to receive the second end section of the grate that is rotatably associated with the receiver unit, thereby providing pivotable engagement between the paddle and the receiver unit.

4. The press system according to claim 2, wherein the paddle further comprises a paddle handle extending out from an area adjacent the tongue in a direction away from the tongue.

5. The press system according to claim 1, wherein the paddle further comprises a curved wall portion forming the trough section, and a paddle handle extending from the curved wall portion.

* * * * *